(12) United States Patent
Wittmann et al.

(10) Patent No.: US 10,477,229 B2
(45) Date of Patent: Nov. 12, 2019

(54) FILTERING MODE FOR INTRA PREDICTION INFERRED FROM STATISTICS OF SURROUNDING BLOCKS

(71) Applicant: Sun Patent Trust, New York, NY (US)

(72) Inventors: Steffen Wittmann, Klipphausen (DE); Virginie Drugeon, Darmstadt (DE); Matthias Narroschke, Schaafheim (DE); Thomas Wedi, The Hague (NL)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/139,491

(22) Filed: Sep. 24, 2018

(65) Prior Publication Data

US 2019/0028728 A1    Jan. 24, 2019

Related U.S. Application Data

(60) Continuation of application No. 15/950,422, filed on Apr. 11, 2018, now Pat. No. 10,116,955, which is a
(Continued)

(51) Int. Cl.
*H04N 19/50* (2014.01)
*H04N 19/176* (2014.01)
(Continued)

(52) U.S. Cl.
CPC ........... *H04N 19/50* (2014.11); *H04N 19/117* (2014.11); *H04N 19/14* (2014.11); *H04N 19/176* (2014.11);
(Continued)

(58) Field of Classification Search
CPC ..................................................... H04N 19/50
(Continued)

(56) References Cited

U.S. PATENT DOCUMENTS 6,281,942 B1 * 8/2001 Wang .................. H04N 5/21
                                                   348/606
6,973,221 B1   12/2005 Xue
(Continued)

FOREIGN PATENT DOCUMENTS

CN    101056412    10/2007
CN    101690226     3/2010
(Continued)

OTHER PUBLICATIONS

International Search Report dated Jul. 5, 2011 in International Application No. PCT/EP2011/002089.
(Continued)

*Primary Examiner* — Yulin Sun
(74) *Attorney, Agent, or Firm* — Wenderoth, Lind & Ponack, L.L.P.

(57) ABSTRACT

The present invention relates to intra prediction which may be performed during encoding and/or decoding of an image signal. In particular, the present invention relates to intra prediction of a current block, during which filtering is applied to the prediction signal and/or to signal used for the prediction. The filtering is applied in accordance with a decision based on characteristics of image signal included in block(s) spatially adjacent to the current block.

2 Claims, 28 Drawing Sheets

Related U.S. Application Data continuation of application No. 14/867,321, filed on Sep. 28, 2015, now Pat. No. 9,973,772, which is a division of application No. 13/643,492, filed as application No. PCT/EP2011/002089 on Apr. 26, 2011, now Pat. No. 9,197,893.

(60) Provisional application No. 61/327,929, filed on Apr. 26, 2010.

(51) Int. Cl.
  *H04N 19/593* (2014.01)
  *H04N 19/117* (2014.01)
  *H04N 19/14* (2014.01)
  *H04N 19/182* (2014.01)
  *H04N 19/80* (2014.01)
  *H04N 19/82* (2014.01)

(52) U.S. Cl.
  CPC ......... *H04N 19/182* (2014.11); *H04N 19/593* (2014.11); *H04N 19/80* (2014.11); *H04N 19/82* (2014.11)

(58) Field of Classification Search
  USPC .................................................... 375/240.29
  See application file for complete search history.

(56) References Cited

U.S. PATENT DOCUMENTS

| | | |
|---|---|---|
| 7,126,989 B2 | 10/2006 | Hagai et al. |
| 7,551,793 B2 | 6/2009 | Guangxi et al. |
| 7,876,829 B2 | 1/2011 | Saito et al. |
| 8,218,629 B2 | 7/2012 | Lee et al. |
| 8,588,545 B2 | 11/2013 | Wedi et al. |
| 2004/0032908 A1 | 2/2004 | Hagai et al. |
| 2005/0100235 A1 | 5/2005 | Kong et al. |
| 2005/0196063 A1 | 9/2005 | Guangxi et al. |
| 2005/0243811 A1* | 11/2005 | Jagadeesan ........... H04L 41/142  370/356 |
| 2005/0243911 A1 | 11/2005 | Kwon et al. |
| 2006/0078048 A1* | 4/2006 | Bjontegaard ........ H04N 19/139  375/240.03 |
| 2006/0126741 A1 | 6/2006 | Saito et al. |
| 2006/0274959 A1* | 12/2006 | Piastowski ............. H04N 19/86  382/268 |
| 2007/0171969 A1* | 7/2007 | Han ....................... H04N 19/82  375/240.1 |
| 2007/0253483 A1 | 11/2007 | Lee et al. |
| 2008/0069244 A1* | 3/2008 | Yano ................... H04N 19/176  375/240.24 |
| 2010/0060749 A1 | 3/2010 | Srinivasan et al. |
| 2010/0128995 A1* | 5/2010 | Drugeon .............. H04N 19/176  382/238 |
| 2010/0177973 A1 | 7/2010 | Wedi et al. |
| 2011/0176614 A1 | 7/2011 | Sato et al. |

FOREIGN PATENT DOCUMENTS

| | | |
|---|---|---|
| EP | 1 555 832 | 7/2005 |
| EP | 2 081 386 | 7/2009 |
| JP | 2003-179933 | 6/2003 |
| JP | 2005-166021 | 6/2005 |
| JP | 2006-165840 | 6/2006 |
| JP | 2010-004555 | 1/2010 |
| JP | 2010-035137 | 2/2010 |
| KR | 10-2007-0037532 | 4/2007 |
| WO | 2009/090884 | 7/2009 |
| WO | 2010/029432 | 3/2010 |

OTHER PUBLICATIONS

Patent Cooperation Treaty (PCT) Written Opinion of the International Searching Authority dated Jul. 5, 2011 in International Application No. PCT/EP2011/002089.

Yu L: "Low-complexity in-loop deblocking filter", ITU Study Group 16—Video Coding Experts Group—ISO/IEC MPEG & ITU-T VCEG(ISO/IEC JTC1/SC29/WG11 and ITU-T SG16 Q6), No. VCEG-Z15r1, Apr. 18, 2005, XP030003460.

Amjed S Al-Fahoum et al: "Combined Edge Crispiness and Statistical Differencing for Deblocking JPEG Compressed Images", IEEE Transactions on Image Processing, IEEE Service Center, Piscataway, NJ, US, vol. 10, No. 9, Sep. 1, 2001, XP011025829, ISSN: 1057-7149.

"Test Model under Consideration", Joint Collaborative Team on Video Coding (JCT-VC) of ITU-T SG16 WP3 and ISO/IEC JTC1/SC29/WG11, JCTVC-B205_draft007 , output document to the JCT-VC meeting in Geneva, CH, Jul. 21-28, 2010.

Office Action and Search Report dated Feb. 3, 2015 in Chinese Application No. 201180021420.2, with partial English translation.

I. Amonou et al., "Annex A CDCM Video Codec: Decoder Specification", Joint Collaborative Team on Video Coding (JCT-VC) of ITU-T SG16 WP3 and ISO/IEC JTC1/SC29/WG11, JCTVC-A114-Annex A, $1^{st}$ Meeting: Dresden, DE, Apr. 15-23, 2010, pp. 1, 47-64 (appendix of JCTVC-A114).

I Amonou et al., "Description of video coding technology proposal by France Telecom, NTT, NTT DOCOMO, Panasonic and Technicolor", Joint Collaborative Team on Video Coding (JCT-VC) of ITU-T SG16 WP3 and ISO/IEC JTC1/SC29/WG11, JCTVC-A114, $1^{st}$ Meeting: Dresden, DE, Apr. 15-23, 2010, pp. 1 and 7.

Summon to attend oral proceedings pursuant to Rule 115(1) EPC dated Feb. 1, 2017 in European Patent Application No. 11717193.4.

Office Action dated Dec. 23, 2015 in European Application No. 11 717 193.4.

Yu-Wen Huang et al., "A Technical Description of MediaTek's Proposal to the JCT-VC CfP", Joint Collaborative Team on Video Coding (JCT-VC) of ITU-T SG16 WP3 and ISO/IEC JTC1/SC29/WG11, JCTVC-A109_r2, 1st Meeting: Dresden, DE, Apr. 15-23, 2010, XP030007543.

Hui Yong Kim et al., "Description of video coding technology proposal by ETRI", Joint Collaborative Team on Video Coding (JCT-VC) of ITU-T SG16 WP3 and ISO/IEC JTC1/SC29/WG11, JCTVC-A127, 1st Meeting: Dresden, DE, Apr. 15-23, 2010, XP 030007579.

Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, JCTVC-A124_r1, 1st Meeting: Dresden, DE, Apr. 15-23, 2010, XP055036046.

* cited by examiner

Fig. 26

| Corresponding standard | Driving frequency |
|---|---|
| MPEG4-AVC | 500MHz |
| MPEG2 | 350MHz |
| ... | ... |

FILTERING MODE FOR INTRA PREDICTION INFERRED FROM STATISTICS OF SURROUNDING BLOCKS

The present invention relates to a picture coding method, apparatus and a program for executing these methods in software. In particular, the present invention relates to applying of filtering during intra prediction.

BACKGROUND OF THE INVENTION

Spatial prediction has been employed in many applications. In particular, spatial prediction forms an essential part of many image and video coding and processing applications. In hybrid image or video coding algorithms, spatial prediction is typically employed for determining a prediction for an image block based on the pixels of already encoded/decoded blocks. On the other hand, spatial prediction may also be used as a part of post processing the decoded image or video signal, in particular for error concealment.

The majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. A new video coding standard is currently being developed by Joint Collaborative Team on Video Coding (JCT-VC) under a name High-Efficiency Video Coding (HEVC), aiming, in particular at improvements of efficiency regarding the high-resolution video coding.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. Typically, a macroblock (usually denoting a block of 16×16 pixels) is the basic image element, for which the encoding is performed. However, various particular encoding steps may be performed for smaller image elements, denoted subblocks or simply blocks and having the size of, for instance, 8×8, 4×4, 16×8, etc. The largest possible size for such a block, for instance in HEVC, is 64×64 pixels. It is then called the largest coding unit (LCU). A subdivision of a LCU into smaller blocks is possible in HEVC. One such block is called a Coding Unit (CU). A CU is the basic image element, for which the coding is performed.

FIG. 1 is an example of a typical H.264/MPEG-4 AVC standard compliant video encoder 100. A subtractor 105 first determines differences between a current block to be encoded of an input video image (input signal) and a corresponding prediction block, which is used for the prediction of the current block to be encoded. In H.264/MPEG-4 AVC, the prediction signal is obtained either by a temporal or by a spatial prediction. The type of prediction can be varied on a per frame basis, per slice basis or on a per macroblock basis.

Macroblocks or CUs predicted using temporal prediction are called inter-encoded and macroblocks or CUs predicted using spatial prediction are called intra-encoded. The type of prediction for a video frame can be set by the user or selected by the video encoder so as to achieve a possibly high compression gain. In accordance with the selected type of prediction, an intra/inter switch 175 provides corresponding prediction signal to the subtractor 105. The prediction signal using temporal prediction is derived from the previously encoded images, which are stored in a memory 140. The prediction signal using spatial prediction is derived from the values of boundary pixels in the neighboring blocks of the same frame, which have been previously encoded, decoded, and stored in the memory 140. The memory unit 140 thus operates as a delay unit that allows a comparison between current signal values to be encoded and the prediction signal values generated from previous signal values. The memory 140 can store a plurality of previously encoded video frames. The difference between the input signal and the prediction signal, denoted prediction error signal or residual signal, is transformed resulting in coefficients, which are quantized 110. Entropy encoder 190 is then applied to the quantized coefficients in order to further reduce the amount of data in a lossless way. This is mainly achieved by applying a code with code words of variable length wherein the length of a code word is chosen based on the probability of its occurrence.

Intra-encoded images (called also I-type images or I frames) consist solely of macroblocks or CUs that are intra-encoded, i.e. intra-encoded images can be decoded without reference to any other previously decoded image. The intra-encoded images provide error resilience for the encoded video sequence since they refresh the video sequence from errors possibly propagated from frame to frame due to temporal prediction. Moreover, I frames enable a random access within the sequence of encoded video images. Intra-frame prediction uses a predefined set of intra-prediction modes. Some of the intra-prediction modes predict the current block using the boundary pixels of the neighboring blocks already encoded. Other intra-prediction modes, as template matching for example, use a search area made of already encoded pixels belonging to the same frame. The predefined set of intra-prediction modes includes some directional spatial intra-prediction modes. The different modes of directional spatial intra-prediction refer to different directions of the applied two-dimensional prediction. This allows efficient spatial intra-prediction in the case of various edge directions. The prediction signal obtained by such an intra-prediction is then subtracted from the input signal by the subtractor 105 as described above. In addition, spatial intra-prediction mode information indicating the prediction mode is provided to the entropy encoder 190 (not shown in FIG. 1), where it is entropy encoded and provided together with the encoded video signal.

In the H.264/MPEG-4 AVC intra coding scheme, the spatial prediction is performed for subblocks of sizes 4×4, 8×8 or 16×16 pixels in order to reduce spatial redundancy. Intra-frame prediction uses a predefined set of intra-prediction modes, which basically predict the current block using the boundary pixels of the neighboring blocks already coded. The different types of directional spatial prediction refer to different edge directions, i.e. the direction of the applied two-dimensional extrapolation. There are eight different directional prediction modes and one DC prediction mode for subblocks of size 4×4 and 8×8, and three different directional prediction modes and one DC prediction mode for the macroblocks of 16×16 pixels. In HEVC, spatial prediction can be performed for CUs of size 4×4, 8×8, 16×16 or 32×32. There are 34 different directional prediction modes for all CU sizes.

Within the video encoder 100, a decoding unit is incorporated for obtaining a decoded video signal. In compliance with the encoding steps, the decoding steps include inverse quantization and inverse transformation 120. The decoded prediction error signal differs from the original prediction error signal due to the quantization error, called also quantization noise. A reconstructed signal is then obtained by adding 125 the decoded prediction error signal to the prediction signal. In order to maintain the compatibility between the encoder side and the decoder side, the prediction signal is obtained based on the encoded and subsequently decoded video signal which is known at both sides the encoder and the decoder. Due to the quantization, quantization noise is superposed to the reconstructed video signal. Due to the block-wise coding, the superposed noise often has blocking characteristics, which result, in particular for strong quantization, in visible block boundaries in the decoded image. In order to reduce these artifacts, a deblocking filter 130 is applied to every reconstructed image block.

In order to be decoded, inter-encoded images require previously encoded and subsequently decoded (reconstructed) image(s). Temporal prediction may be performed uni-directionally, i.e., using only video frames ordered in time before the current frame to be encoded, or bi-directionally, i.e., using also video frames following the current frame. Uni-directional temporal prediction results in inter-encoded images called P frames; bi-directional temporal prediction results in inter-encoded images called B frames. In general, an inter-encoded image may comprise any of P-, B-, or even I-type macroblocks. An inter-encoded macroblock (P- or B-macroblock) or an inter-encoded CU is predicted by employing motion compensated prediction 160. First, a best-matching block is found for the current block within the previously encoded and decoded video frames by a motion estimator 165. The best-matching block then becomes a prediction signal and the relative displacement between the current block and its best match is signalized as motion data in the form of three-dimensional (one temporal, two spatial) motion within the bitstream comprising also the encoded video data. In order to optimize the prediction accuracy, motion vectors may be determined with a spatial sub-pixel resolution e.g. half pixel or quarter pixel resolution. This is enabled by an interpolation filter 150.

For both, the intra- and the inter-encoding modes, the differences between the current input signal and the prediction signal are transformed and quantized by the unit 110, resulting in the quantized coefficients. Generally, an orthogonal transformation such as a two-dimensional discrete cosine transformation (DCT) or an integer version thereof is employed since it reduces the correlation of the natural video images efficiently. After the transformation, low frequency components are usually more important for image quality than high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding. H.264/MPEG-4 AVC employs scalar quantization 110, which can be controlled by a quantization parameter (QP) and a customizable quantization matrix (QM). One of 52 quantizers is selected for each macroblock by the quantization parameter. In addition, quantization matrix is specifically designed to keep certain frequencies in the source to avoid losing image quality. Quantization matrix in H.264/MPEG-4 AVC can be adapted to the video sequence and signalized together with the video data.

The H.264/MPEG-4 AVC includes two functional layers, a Video Coding Layer (VCL) and a Network Abstraction Layer (NAL). The VCL provides the encoding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

In order to improve the image quality, a so-called post filter 280 may be applied at the decoder side 200. The H.264/MPEG-4 AVC standard enables sending of post filter information for such a post filter via the SEI message. The post filter information is determined at the encoder side by means of a post filter design unit 180, which compares the locally decoded signal and original input signal. In general, the post filter information is an information allowing decoder to set up an appropriate filter. It may include directly the filter coefficients or another information enabling setting up the filter. The filter information, which is output by the post filter design unit 180 is also fed to the entropy coding unit 190 in order to be encoded and inserted into the encoded signal. Such an adaptive filter may also be used as a second post-filter, as for example in the HEVC standard.

FIG. 2 illustrates an example decoder 200 compliant with the H.264/MPEG-4 AVC video coding standard. The encoded video signal (input signal to the decoder) bitstream first passes to entropy decoder 290, which decodes the quantized coefficients, the information elements necessary for decoding such as motion data, mode of prediction etc., and the post filter information. In the entropy decoder 290, spatial intra-prediction mode information is extracted from the bitstream, indicating the type/mode of the spatial prediction applied to the block to be decoded. The extracted information is provided to the spatial prediction unit 270 (not shown in FIG. 2). The quantized coefficients are inversely scanned in order to obtain a two-dimensional matrix, which is then fed to inverse quantization and inverse transformation 220. After inverse quantization and inverse transformation, a decoded (quantized) prediction error signal is obtained, which corresponds to the differences obtained by subtracting the prediction signal from the signal input to the encoder in the case no quantization noise is introduced.

The prediction signal is obtained from either a temporal or a spatial prediction 260 and 270, respectively, which are switched 275 in accordance with a received information element signalizing the prediction applied at the encoder. The decoded information elements further include the information necessary for the prediction such as prediction type in the case of intra-prediction (a spatial intra-prediction mode information) and motion data in the case of motion compensated prediction. Depending on the current value of the motion vector, interpolation of pixel values may be needed in order to perform the motion compensated prediction. This interpolation is performed by an interpolation filter 250. The quantized prediction error signal in the spatial domain is then added by means of an adder 225 to the prediction signal obtained either from the motion compensated prediction 260 or intra-frame prediction 270. The reconstructed image may be passed through a deblocking filter 230 and the resulting decoded signal is stored in the memory 240 to be applied for temporal or spatial prediction of the following blocks. The post filter information is fed to a post filter 280, which sets up a post filter accordingly. The post filter is then applied to the decoded signal in order to further improve the image quality.

Directional intra prediction modes are very efficient to predict sharp edges, but are not adapted to predict smooth or out of focus regions. For such regions smoothing the references with a low pass filter is particularly appropriate and provides gains in terms of coding efficiency. Thus, applying a low pass filter on the reference pixels for intra prediction is a known technique to remove the quantization noise added to the reconstructed pixels and to improve intra prediction, especially when the region of the image to be predicted is blurred or out of focus.

SUMMARY OF THE INVENTION

The problem underlying the present invention is that if a low pass filter is applied to the references, sharp edges can not be predicted efficiently.

The aim of the present invention is to provide an improved and more efficient intra prediction for encoding and decoding of an image.

This is achieved by the features of independent claims.

Further embodiments of the present invention are subject matter of the dependent claims.

It is a particular approach of the present invention to distinguish whether a low-pass filter has to be applied to reference pixels or to prediction signal of a current image area or not. This distinguishing is based on characteristics of the image signal adjacent spatially to the current image area.

According to an aspect of the present invention, a method is provided for decoding, on a block-by-block basis, encoded image data partitioned into a plurality of blocks, said method comprising the steps of: deriving statistics of previously decoded data spatially adjacent to the current block; deciding on the basis of the derived statistics whether filtering is to be applied or not during intra prediction; and predicting a current block from image data of previously decoded blocks.

According to another aspect of the present invention, a method is provided for encoding, on a block-by-block basis, image data partitioned into a plurality of blocks, said method comprising the steps of: deriving statistics of previously decoded data spatially adjacent to the current block; deciding on the basis of the derived statistics whether filtering is to be applied or not during intra prediction; and predicting a current block from image data of previously decoded blocks.

According to another aspect of the present invention, an apparatus is provided for decoding, on a block-by-block basis, encoded image data partitioned into a plurality of blocks, said apparatus comprising: a calculation unit for deriving statistics of previously decoded data spatially adjacent to the current block; a judging unit for deciding on the basis of the derived statistics whether filtering is to be applied or not during intra prediction; and a directional prediction unit for predicting a current block from image data of previously decoded blocks.

According to another aspect of the present invention, an apparatus is provided for encoding, on a block-by-block basis, image data partitioned into a plurality of blocks, said apparatus comprising: a calculation unit for deriving statistics of previously decoded data spatially adjacent to the current block; a judging unit for deciding on the basis of the derived statistics whether filtering is to be applied or not during intra prediction; and a directional prediction unit for predicting a current block from image data of previously encoded and decoded blocks.

In accordance with still another aspect of the present invention, a computer program product is provided comprising a computer-readable medium having a computer-readable program code embodied thereon, wherein the program code is adapted to carry out the above described method.

The above and other objects and features of the present invention will become more apparent from the following description and preferred embodiments given in conjunction with the accompanying drawings, in which:

FIG. 26 is a schematic drawing showing an example of a look-up table in which the standards of video data are associated with the driving frequencies;

DETAILED DESCRIPTION

Figure 1:
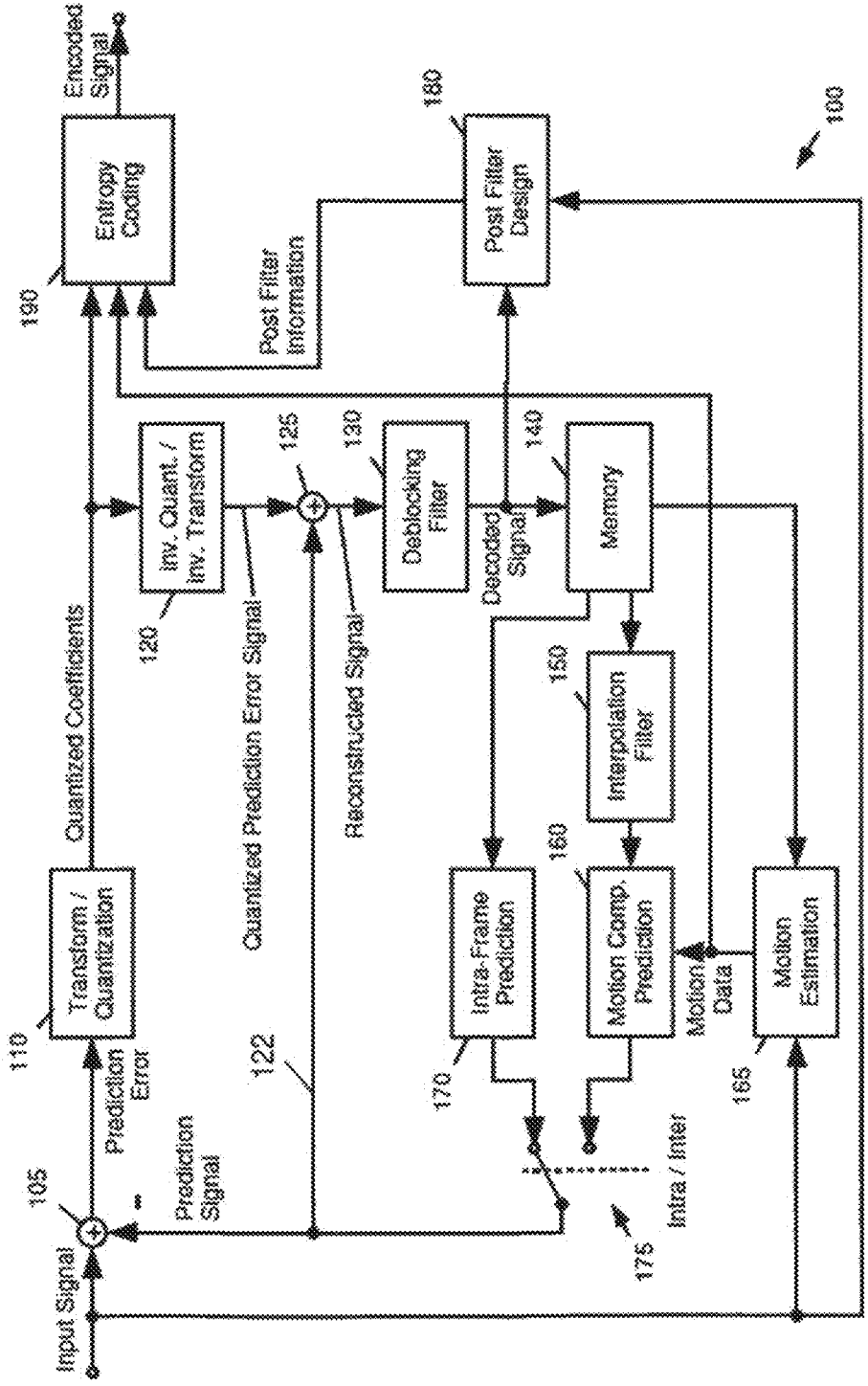
FIG. 1 is a block diagram illustrating an example of a conventional H.264/MPEG-4 AVC video encoder.
Figure 2:
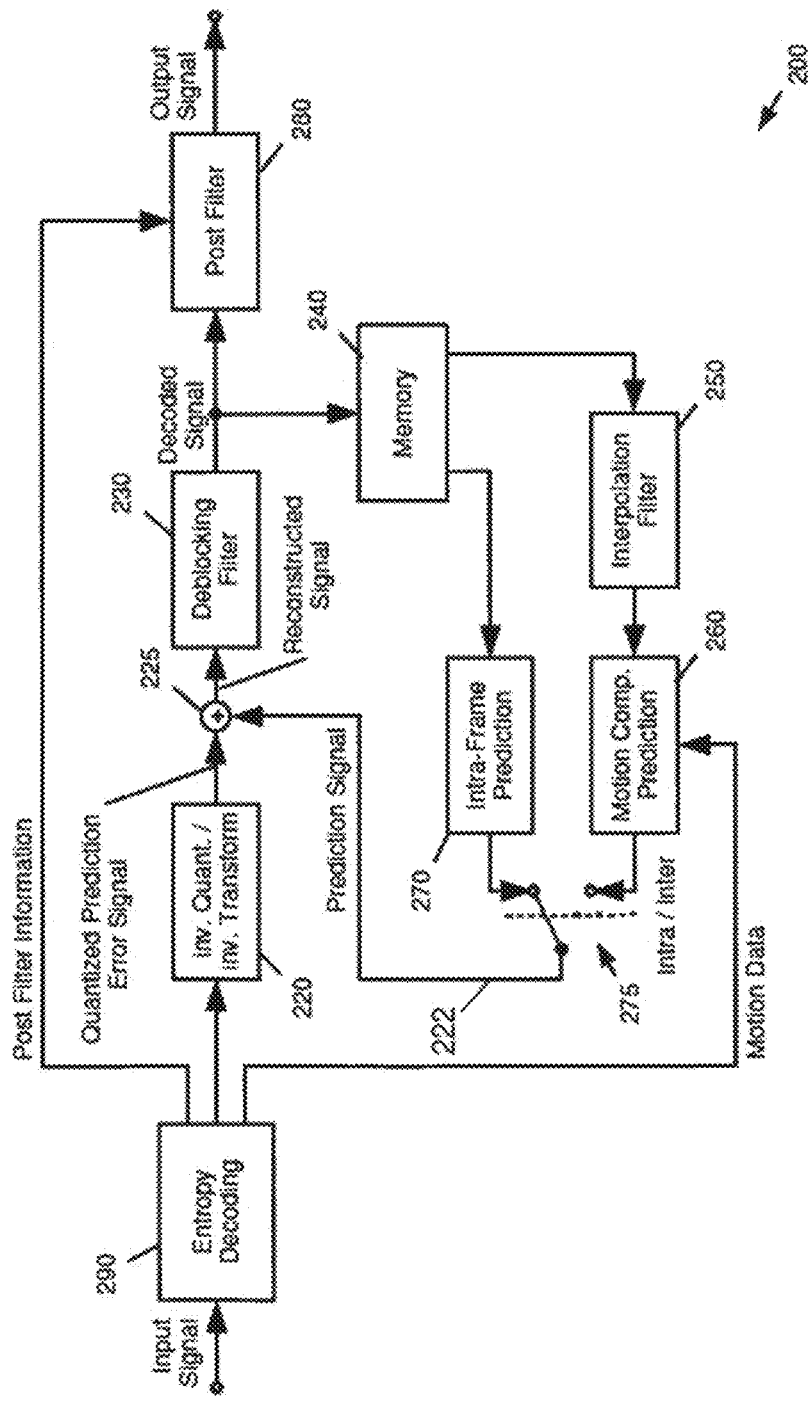
FIG. 2 is a block diagram illustrating an example of a conventional H.264/MPEG-4 AVC video decoder.

The problem underlying the present invention is based on observation that if a low pass filter is applied to reference pixels or to prediction signal, sharp edges cannot be predicted efficiently. Therefore, it is necessary to distinguish whether a low-pass filter has to be applied to the reference pixels or to prediction signal or not.

A possible solution is to signal by a flag transmitted for each block whether to smooth (low-pass filter) or not. However, this approach will likely result in an increased bit rate and thus limit the overall coding efficiency.

In accordance with the present invention, a method for decoding and/or encoding on a block-by-block basis image data partitioned into a plurality of blocks is provided, wherein the method comprises the steps of: predicting a current block from image data of previously decoded blocks, deriving statistics of previously decoded data adjacent to the current block, such as the presence of edges or the variance of the signal; and deciding on the basis of the derived statistics whether filtering is to be applied or not during intra prediction.

One of the advantages of the present invention is that the application of filtering used during intra prediction is adaptive with respect to the content of the image signal and thus, higher prediction quality may be achieved.

Preferably, filtering is applied to the pixels used for the prediction. However, the present invention is not limited thereto. In accordance with another embodiment, filtering is applied to the prediction signal.

Advantageously, the derivation of statistics of the previously decoded signal is performed by calculating the variance of the signal of the surrounding blocks. Alternatively, the derivation of statistics of the previously decoded signal is performed by applying an edge detection method such as calculating gradients using a Sobel operator or any other matrix suitable for the calculation of gradients in a 2D signal; and comparing the norm of these gradients to a threshold.

In particular, the filtering may be applied if the variance of the signal of the surrounding blocks is below a predefined threshold; and no filtering may be applied if the variance of the signal of the surrounding blocks is above a predefined threshold.

Alternatively, the filtering may be applied if no edge is detected; and no filtering may be applied if an edge is detected.

In accordance with an embodiment of the present invention, filtering is applied only for the pixels located in a region that is not intersected by the line calculated by extending the detected edge. In particular, the filter is not applied to pixels in a line of reference pixels, which are closer than predefined number of pixels from the intersection of the detected edge with the line of pixels. The line of pixels may be row and/or column of pixels.

Different filters may be applied to pixels depending on their position relative to the line calculated by extending the detected edge.

In particular, a first filter is applied to pixels in a line of reference pixels, which are closer than predefined number of pixels from the intersection of the detected edge with the line of pixels. And a second filter is applied to remaining pixels. However, the present invention is not limited thereto and more different filters may be applied depending on the position of the reference pixel to be filtered with respect to the prolonged detected edge. Advantageously, pixels in proximity of the edge are filtered in the direction of the edge. Advantageously, pixels that are not in proximity of the edge are filtered using a low-pass filter.

One of the benefits of the present invention is that both sharp edges and smooth areas can be predicted and encoded efficiently, without increase of overhead bit rate.

In accordance with a first embodiment of the present invention, an image coding apparatus is provided, which has, in place of the H.264/AVC intra prediction unit that calculates directional prediction based on reference neighboring pixels, a new intra prediction unit that analyses the statistics of the neighboring signal (by performing edge prediction or variance calculation for example) and applies filtering after or before calculating directional prediction.

Figure 3:
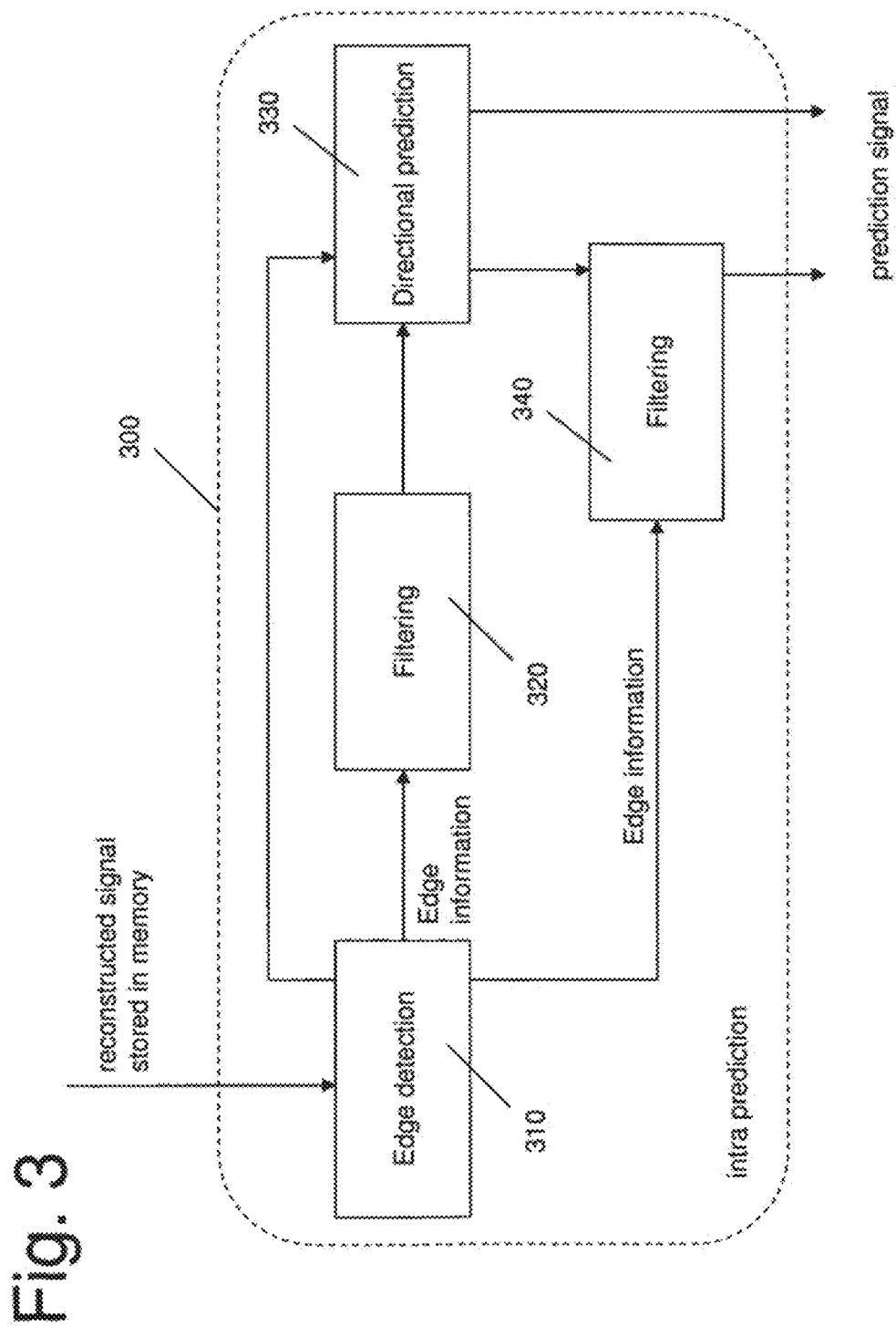
FIG. 3 is a block diagram illustrating an intra prediction unit in accordance with an embodiment of the present invention.

FIG. 3 is a block diagram for explaining a specific construction of the intra prediction unit 300 in accordance with the first embodiment of the present invention. This intra prediction unit 300 has a calculation unit (in this case an edge detection unit) 310 to determine if an edge is present in the reconstructed neighboring signal and to determine its direction and/or location if an edge is present; a first filtering unit 320 to filter the reference pixels used for directional prediction (using, for example, a filter such as the low pass filter applied in H.264/MPEG-4 AVC for 8×8 intra prediction or such as defined in the first version of the HEVC standard in document JCTVC-B205_draft007, output document to the JCT-VC meeting in Geneva, CH, 21-28 Jul. 2010) depending on the output of the edge detection unit 310; a directional prediction unit 330 to predict the block according to one given directional prediction, similar to the H.264/MPEG-4 AVC intra prediction unit in the encoder 170 and/or in the decoder 270 or similar to the intra prediction as described in EP 2 081 386 A1; and a second filtering unit 340 to filter the output of the directional prediction unit 330 depending on the output of the edge detection unit 310.

In order to increase the coding efficiency, EP 2 081 386 A1 provides an improved spatial prediction in which the number of prediction directions for predicting pixels of a block is not limited to eight. Rather, edge detection is performed within the already decoded neighboring blocks. Based on a direction of the edge determined as dominant, the pixels of the block are predicted possibly from a sub-pel position within the line of pixels belonging to a neighboring block.

Alternatively, the calculation unit 310 can be a variance calculation unit to calculate the variance of the neighboring signal. In that case, the two filtering units filter the reference pixels or the output of the directional prediction unit depending on the output of the variance calculation unit. The reconstructed neighboring signal here refers to decoded pixels (samples) in the blocks surrounding the current block.

Figure 4:
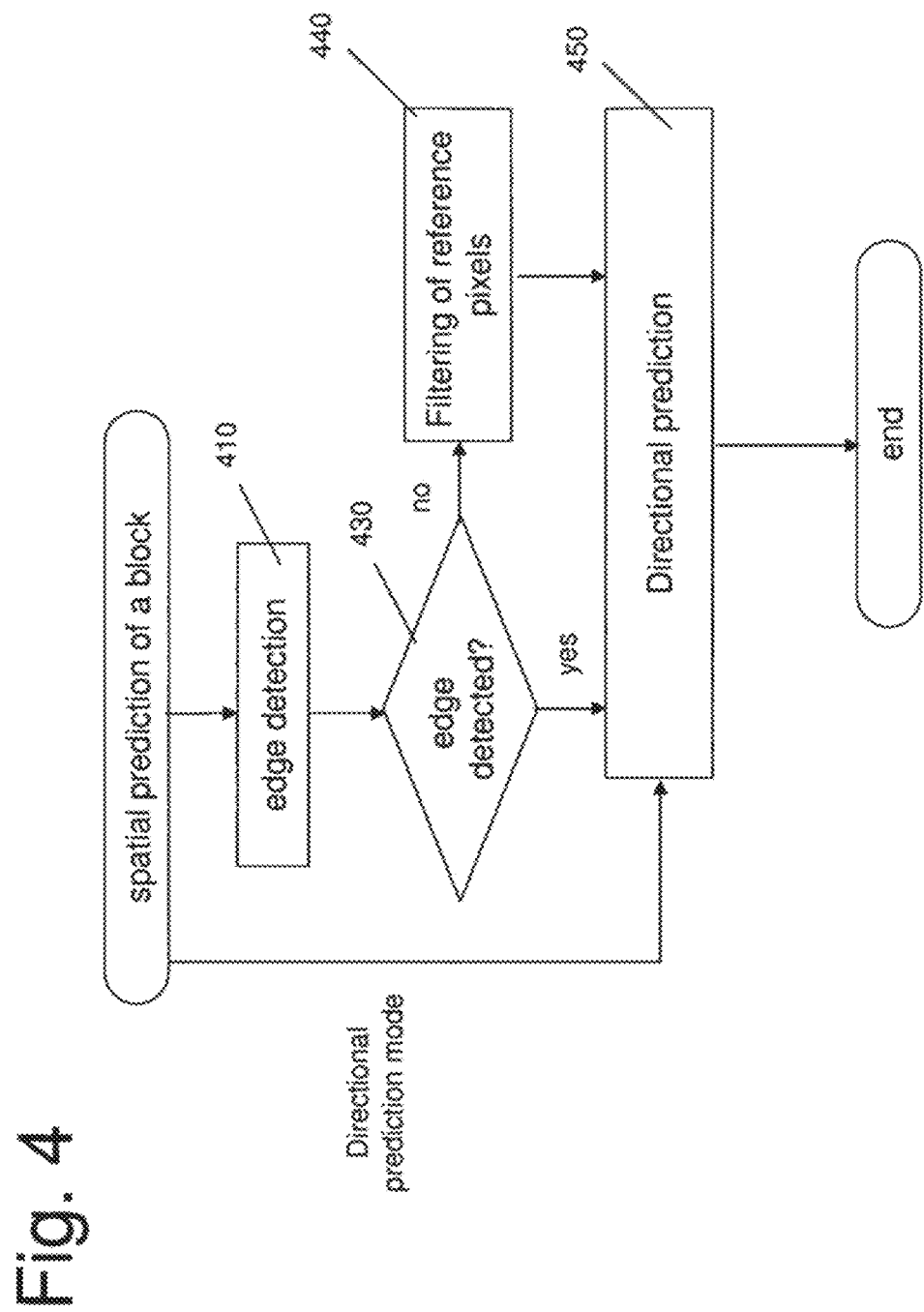
FIG. 4 is a flow chart illustrating a method for intra prediction filtering according to a first embodiment of the present invention, using edge detection.

FIG. 4 is a flow chart for explaining an example method which may be performed by the intra prediction unit. In order to perform the method, this intra prediction unit has an edge detection unit which is capable of determining 410, 430 whether an edge is present in the reconstructed neighboring signal; a filtering unit for filtering 440 the reference pixels used for directional prediction in case no edge is detected (step 410 and "no" in step 430) in the edge detection unit; and a directional prediction unit for predicting 450 the block according to one given directional prediction, which may be similar to the H.264/MPEG-4 AVC directional intra prediction methods as described above or similar to the intra prediction as described in EP 2 081 386 A1.

Figure 5:
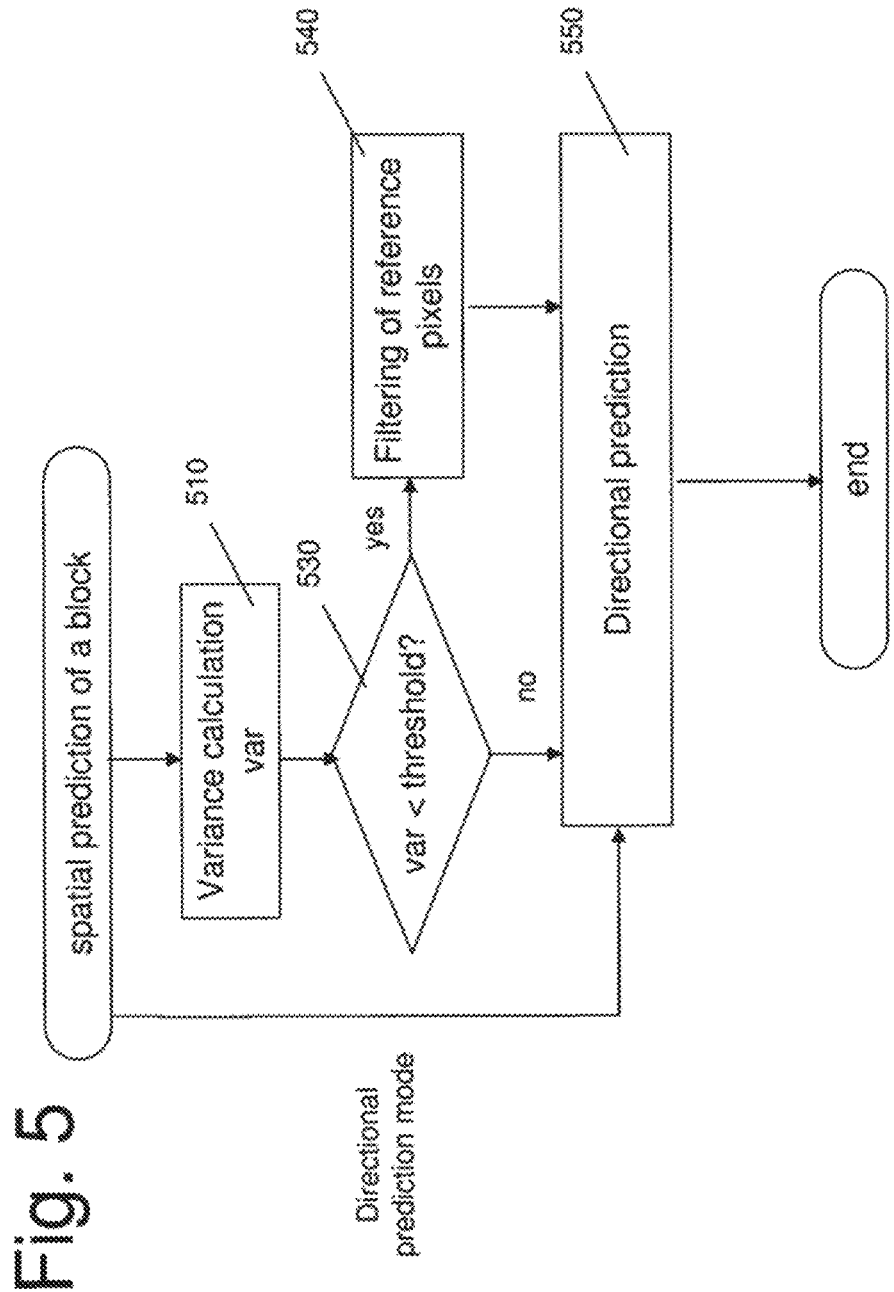
FIG. 5 is a flowchart illustrating a method for intra prediction filtering according to a first embodiment of the present invention, using variance calculation.

FIG. 5 is a block diagram for explaining another example of a specific construction of the intra prediction unit and a method for performing the present invention. This intra prediction unit has a calculation unit (a variance calculation unit) to determine 510, 530 if the variance of the reconstructed neighboring signal is below a predefined threshold; a filtering unit to filter 540 the reference pixels used for directional prediction in case the variance of the reconstructed neighboring signal is below a predefined threshold; and a directional prediction unit to predict 550 the block according to one given directional prediction.

As described above, the first embodiment includes a method and an apparatus for efficiently encoding both sharp edges and smooth areas without increasing the overhead bit rate by deriving the necessary information from the reconstructed neighboring signal. This may be performed in the same way by both the encoder and the decoder.

It is noted that the above method steps described with reference to FIGS. 4 and 5 may also be performed by any other apparatus having a structure different for the above described example. In particular, the steps of the flow charts may also be performed by any kind of processor or device.

One of the problems that may arise with the embodiment described above is that the analysis of the characteristics of the neighboring signal has to be performed for each block at the encoder 100 and the decoder 200 side independently from the selected directional intra prediction mode. This increases the complexity of intra prediction in a decoder or in a well-optimized encoder. To avoid performing this analysis for every block, a second embodiment of the present invention introduces a new intra prediction mode in addition to the H.264/MPEG-4 AVC directional intra prediction modes, such as the intra prediction method disclosed in EP 2 081 386 A1. The analysis on the neighboring signal is performed only when the new intra prediction mode is selected. The intra prediction unit as described with reference to FIG. 3 is used only if the new intra prediction mode is selected. For all the other modes, the H.264/MPEG-4 AVC intra prediction unit 170 and/or 270 in encoder and decoder, respectively, is used.

This new intra prediction mode relies on edge detection in the neighboring signal. Filtering is applied if no edge is detected and filtering is not applied if an edge is detected.

Figure 6:
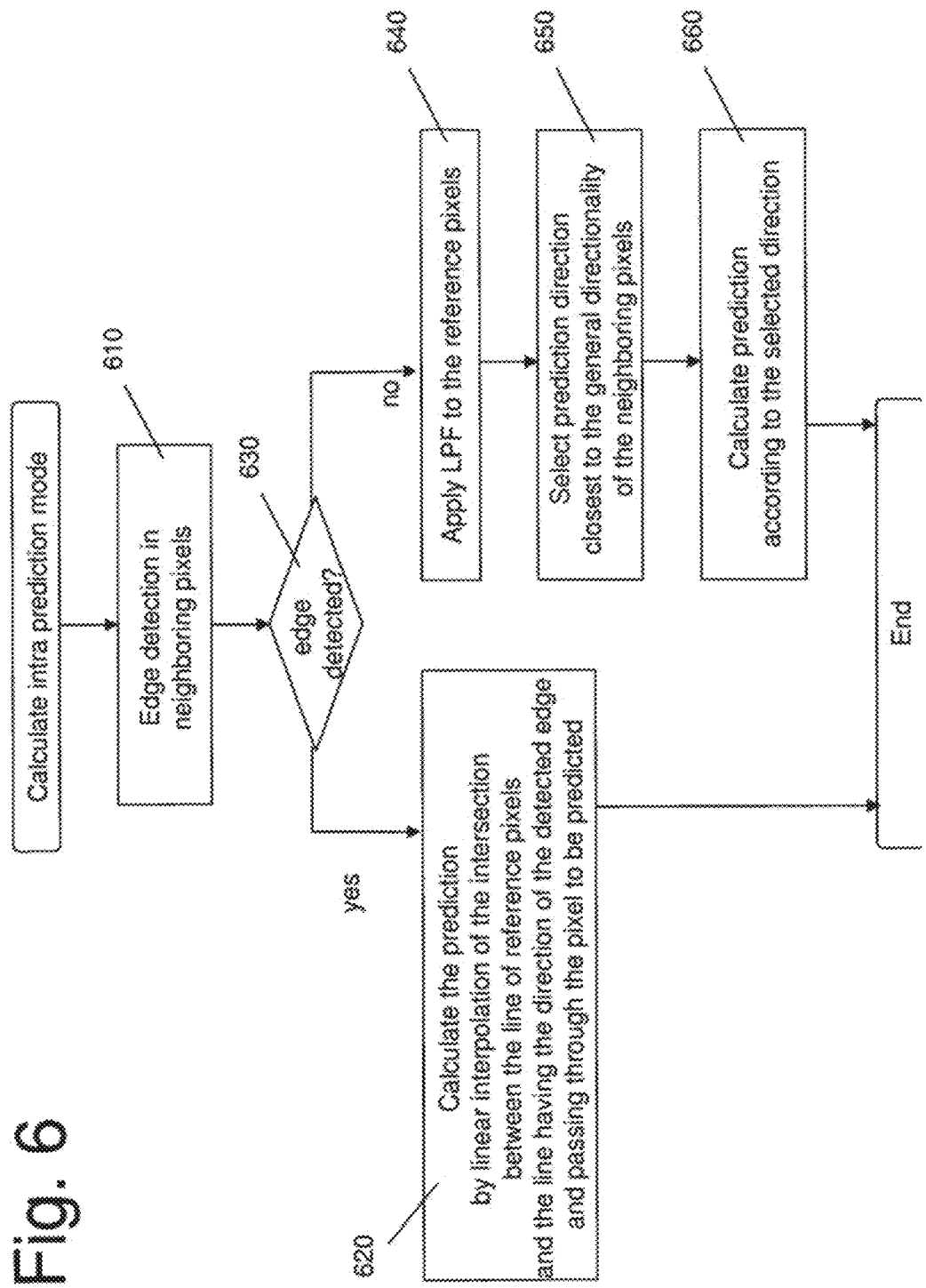
FIG. 6 is a flow chart illustrating a method for intra prediction filtering according to a second embodiment of the present invention employing a special prediction mode.

FIG. 6 shows a flow chart describing the process to calculate the prediction according to this new intra prediction mode. The first step is to perform edge detection 610 in the already reconstructed neighboring signal. One possibility for edge detection is to apply the Sobel operators on blocks of 3×3 pixels in the neighboring signal:

$$S_x = \begin{bmatrix} -1 & 0 & 1 \\ -2 & 0 & 2 \\ -1 & 0 & 1 \end{bmatrix}, S_y = \begin{bmatrix} -1 & -2 & -1 \\ 0 & 0 & 0 \\ 1 & 2 & 1 \end{bmatrix}.$$

Other matrices that are suitable for the calculation of gradients in a 2D signal may also be used.

For each block of 3×3 pixels, an edge vector can be defined that is perpendicular to the gradient vector. To determine the main edge direction, the edge vector with the maximum norm can be considered, or a combination of the edge vectors with the biggest norms.

In general, edges in an image may be detected by determining a gradient vector field of the image. A gradient vector is larger on an edge and is perpendicular thereto. One of the most popular approaches to detecting the gradient field is convolution of the image with vertical and horizontal matrices such as the Sobel operators, given by the above masks Sx and Sy.

In particular, a vertical gradient vector coordinate Gx and a horizontal gradient vector coordinate Gy in a particular pixel p(x, y) are then obtained by filtering the pixel p(x, y) with the vertical Sx and the horizontal Sy Sobel mask, respectively.

Many applications employ Sobel operator for obtaining the gradient field. However, the present invention is not limited to detecting the gradient field by means of the Sobel operator. In general, any edge detection mechanism may be employed that provides the gradient field. For instance, masks with other sizes than Sobel operator may be used such as 2×2 or 4×4, or even larger masks may be used. The selection of the particular mask depends on the desired results. Employing larger masks may add on precision of the edge detection and suppress detection of small local edges, but on the other hand, it increases the computational complexity. Alternatively, masks other than Sobel mask may be used for edge detection, such as Scharr operator, or operators based on higher derivatives.

After obtaining the vertical Gx and the horizontal Gy coordinates of the gradient G, for a plurality of pixels of blocks surrounding the block to be predicted, a dominant gradient may be determined. A dominant edge vector E with its horizontal and vertical coordinates Ex and Ey, respectively, is perpendicular on the gradient vector G. Correspondingly, the sizes of the horizontal Ex and vertical Ey components of the dominant edge vector E correspond to the sizes of horizontal Gy and vertical Gx gradient, respectively (for instance, Ex=−Gy, Ey=Gx for a counter-clock rotation).

Typically, the dominant edge for a current block is determined to be an edge with a maximum norm out of edges that intersect the current block. However, other methods may be used as well, for instance, taking a weighting average of the edges, or the edge direction detected for a majority of pixels, etc. It should be noted that the calculation of gradient is not necessarily performed for the entire adjacent blocks. In general, it is advantageous to select a sub-set of pixels near to the boundaries to the block to be predicted and calculating the gradient only for these pixels. This approach reduces the number of operations necessary for convolution of the adjacent blocks with the edge detection masks. Moreover, for the prediction, only the edges likely to be similar to the actual edges inside the block to be predicted are of importance, thus edge detection near to the boundaries also reduces the risk of detecting a useless edge.

The norm of the final edge vector or the norms of each calculated edge vectors can be compared to a predefined threshold. If one norm is above the threshold, an edge is detected. In that case, the edge vectors give the direction of the edge and the position of the 3×3 blocks of pixels where the strongest edge vectors have been calculated give the position of the edge. If no norm is above the threshold, no edge is detected.

Then the result of the detection is evaluated 630. If an edge is detected ("yes" in step 630), the prediction is performed by interpolation 620 of sub-pel reference pixels depending on the direction of the edge as described in EP 2 081 386 A1. In particular, the prediction signal is calculated by linear extrapolation of the intersection between the line of reference pixels and the line having the direction of the detected edge and passing through the pixel to be predicted. If no edge is detected ("no" in step 630), the next step includes applying 640 a low pass filter on the reference pixels in order to smooth the signal used for prediction. Here, the reference pixels may be a row of pixels of the top neighbouring block, the row being closest to the boundary with the current block. Alternatively, the reference pixels may be a column of pixels of the left neighbouring block, the column being closest to the boundary with the current block. The reference pixels may also be a set of pixels from the top row and the left column. The following step includes selecting 650 one given predefined direction, for example, the direction that is closest to the direction of the edge vector with the biggest norm. In particular, it may be direction corresponding to general direction of the neighboring pixels, which may be determined during the edge detecting step 610. The prediction is then performed 660 using the prediction method as defined for the selected predefined direction.

Alternatively, the direction of the edge vector with the strongest norm could be selected instead of one of the predefined directions. In that case, the prediction step could use the method described in EP 2 081 386 A1.

According to a third embodiment of the present invention, a low pass filter is applied for some reference pixels and no filter is applied for other reference pixels, resulting in switching the use of the smoothing filter on a pixel-by-pixel basis for each block.

Figure 7:
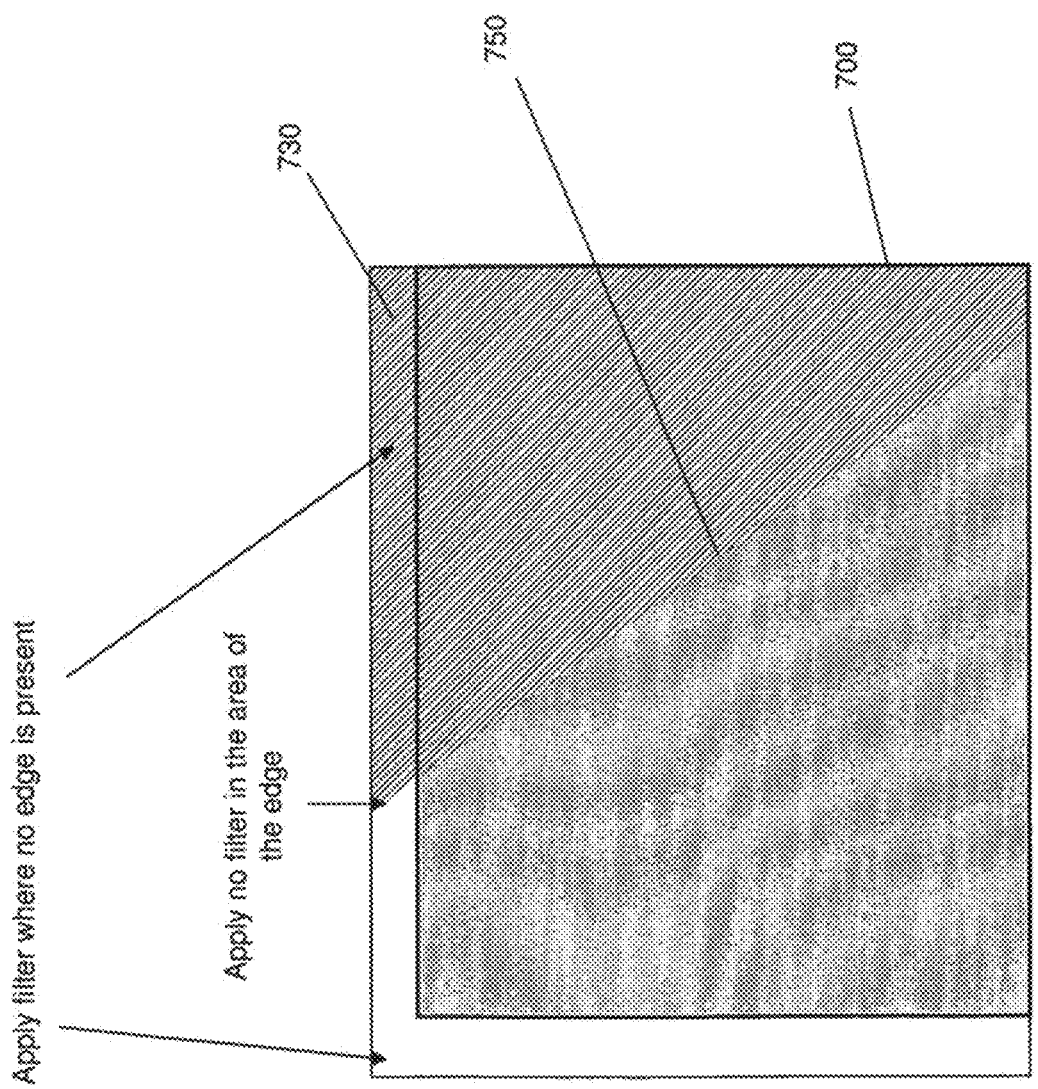
FIG. 7 is a schematic drawing illustrating application of filtering according to a third embodiment of the present invention.

This embodiment is schematically illustrated in FIG. 7. If edge detection is used, it is possible to extend the edge through the line of reference pixels and through the block to be predicted as shown by the edge 750. In that case, filtering may advantageously be switched off for the n pixels, with n equal to 1 or 2 for example, located around the edge. On the other hand, the filtering may be applied to the other pixels. FIG. 7 shows a row of reference pixels 730 used for intra prediction of the current block 700. In accordance with this embodiment, the reference pixels in the row of reference pixels 730 and near to the edge 750 are not filtered. The number n of the pixels not to be filtered may be defined with regard to the length of applied low pass filter in such a way that the pixels used for filtering do not cross the edge.

Figure 8:
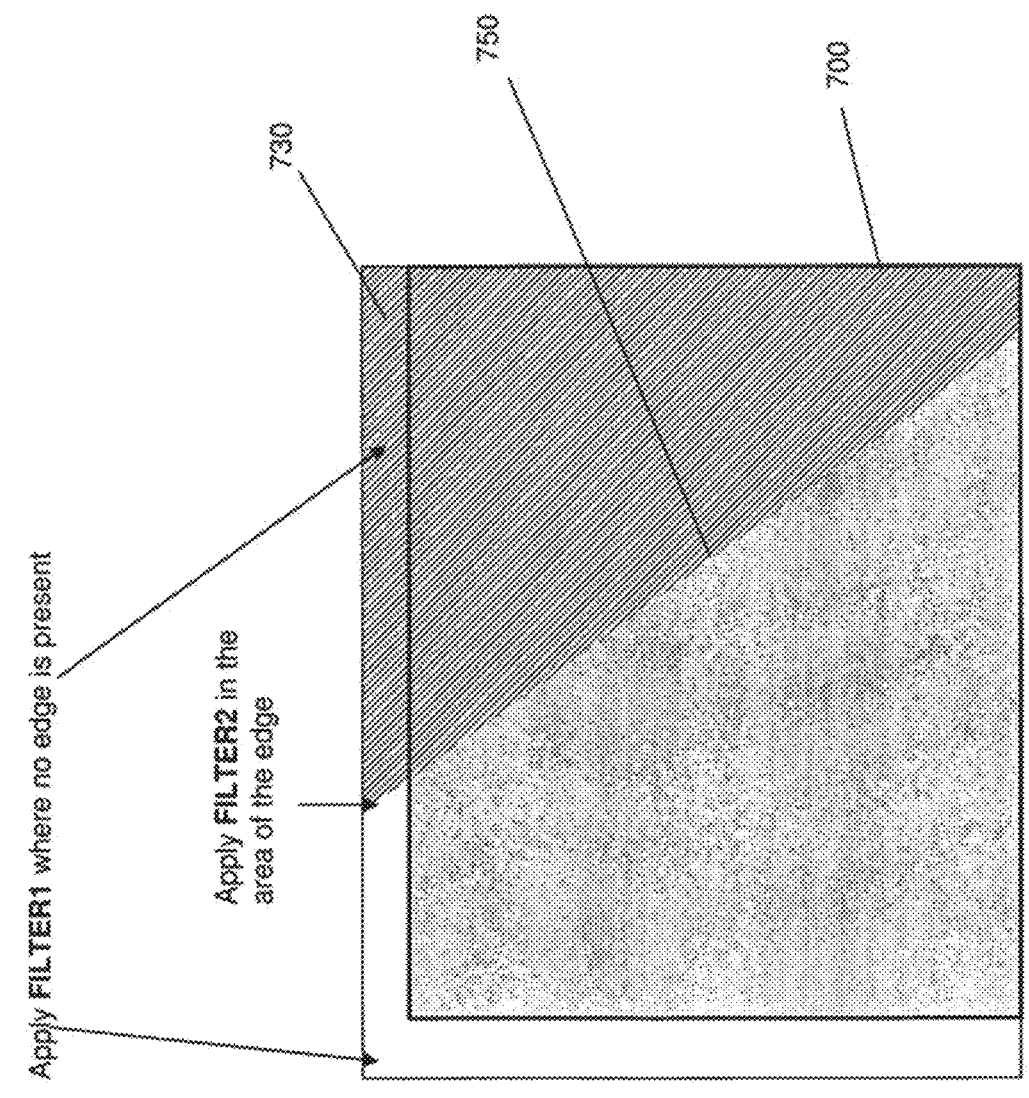
FIG. 8 is a schematic drawing illustrating application of filtering according to a fourth embodiment of the present invention.

According to a fourth embodiment of the present invention, different kinds of filtering are applied for the n pixels around the edge and for the other pixels belonging to flat areas. This embodiment is illustrated in FIG. 8. In that case, FILTER1 is a low pass filter similar to the low pass filters used to filter the reference pixels in the prior art (H.264/MPEG-4 AVC standard or HEVC working draft JCTVC-B205_draft007). FILTER2 is advantageously a smoothing filter in the direction of the edge only. FILTER2 is preferably not smooth in the direction perpendicular to the edge. The effect of FILTER2 is to sharpen the edge.

In accordance with a fifth embodiment of the present invention, a decoder applies the same techniques as described in the first embodiment. The only difference in FIG. 3 is that the selected directional prediction mode is transmitted as input to the directional prediction unit.

Generally, a decoder may apply the same intra prediction techniques as described in embodiments one to four.

Hereinafter, the applications to the video coding method and the video decoding method described in each of embodiments and systems using thereof will be described.

Figure 9:
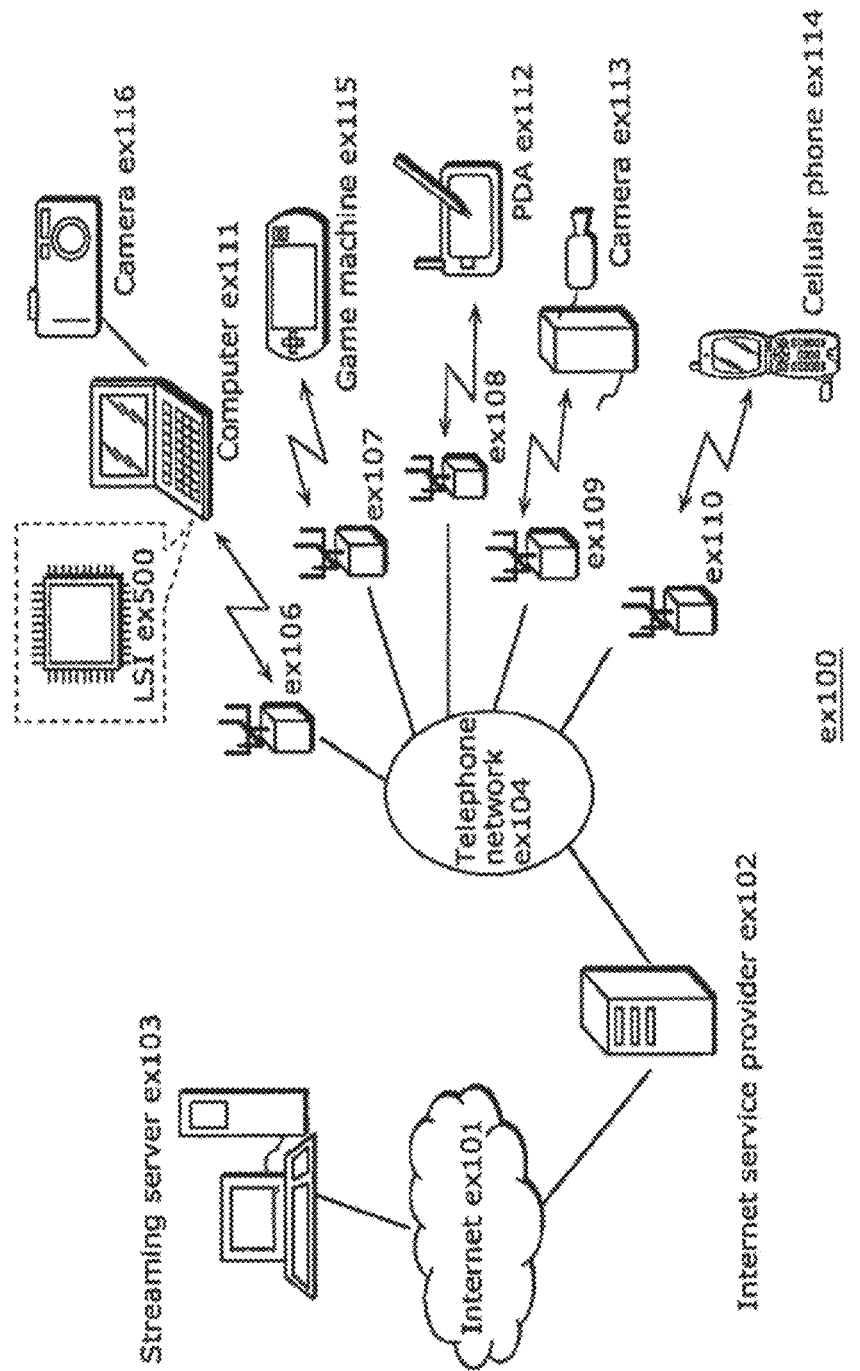
FIG. 9 is a schematic drawing of an overall configuration of a content providing system for implementing content distribution services.

FIG. 9 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 9, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 10:
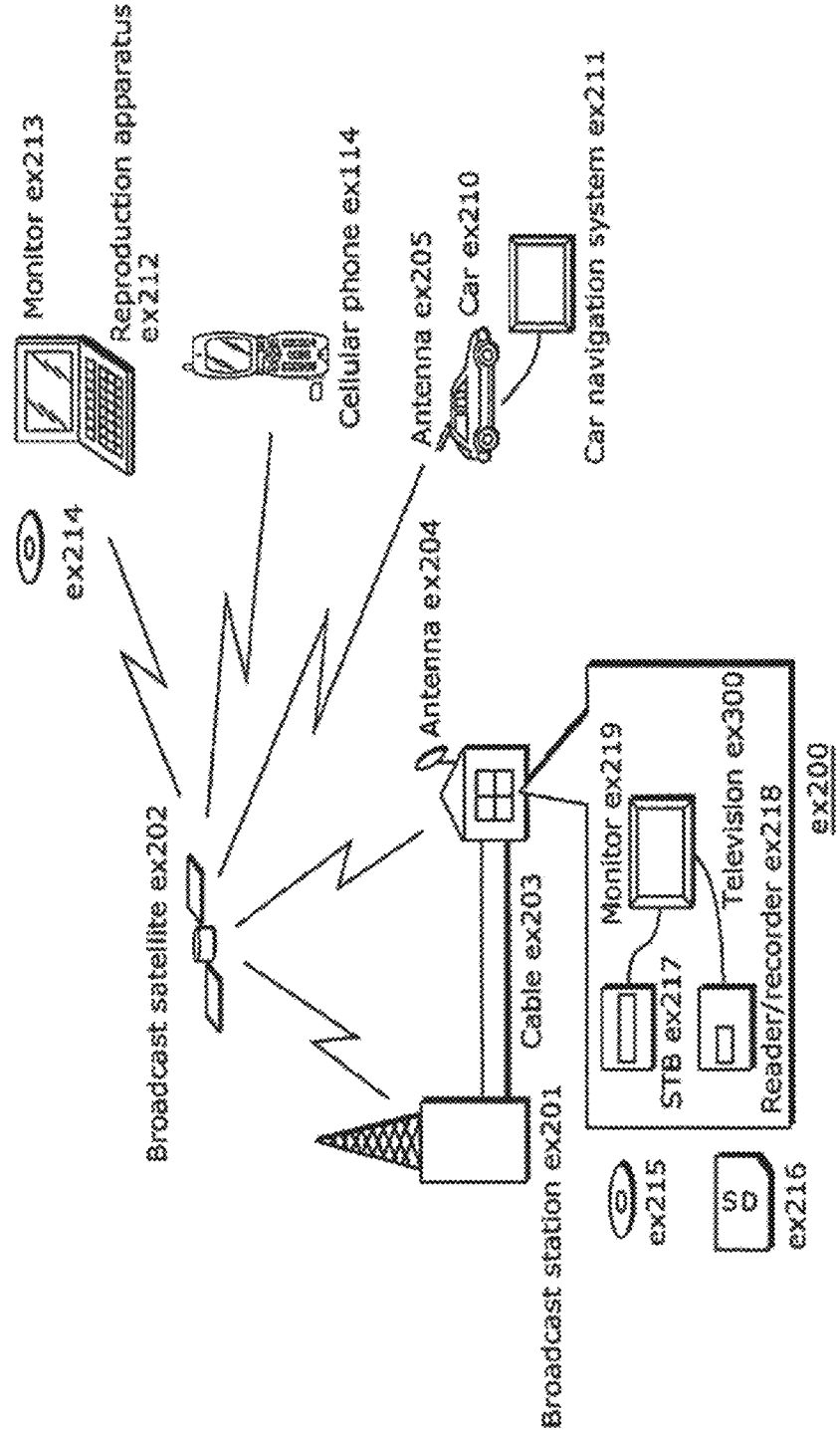
FIG. 10 is a schematic drawing of an overall configuration of a digital broadcasting system.

Aside from the example of the content providing system ex100, at least one of the video coding apparatus and the video decoding apparatus described in each of embodiments may be implemented in a digital broadcasting system ex200 illustrated in FIG. 10. More specifically, a broadcast station ex201 communicates or transmits, via radio waves to a broadcast satellite ex202, multiplexed data obtained by multiplexing audio data and others onto video data. The video data is data coded by the video coding method described in each of embodiments. Upon receipt of the multiplexed data, the broadcast satellite ex202 transmits radio waves for broadcasting. Then, a home-use antenna ex204 with a satellite broadcast reception function receives the radio waves.

Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the video decoding apparatus or the video coding apparatus as shown in each of embodiments. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

Figure 11:
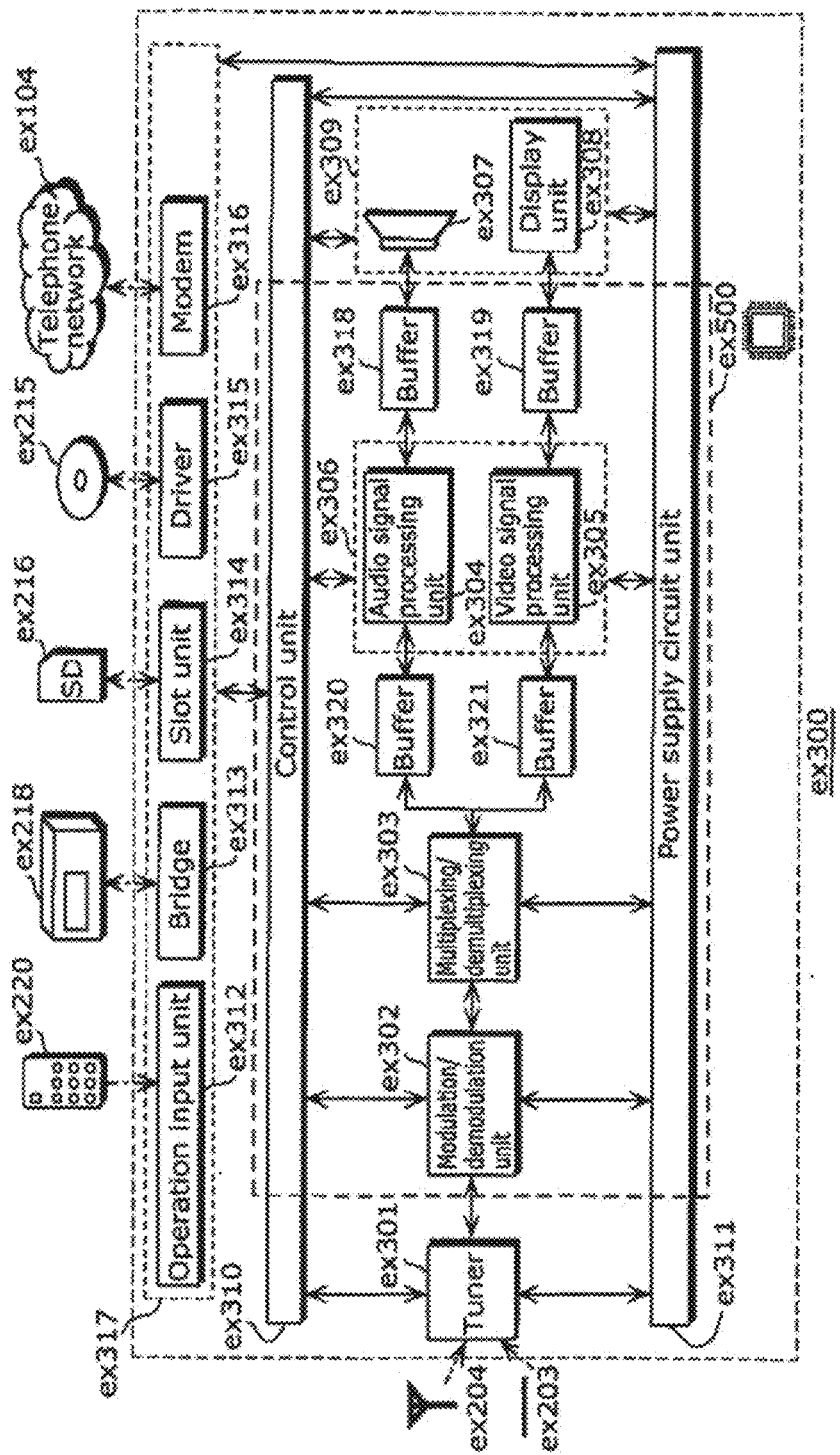
FIG. 11 is a block diagram illustrating an example of a configuration of a television.

FIG. 11 illustrates the television (receiver) ex300 that uses the video coding method and the video decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 12:
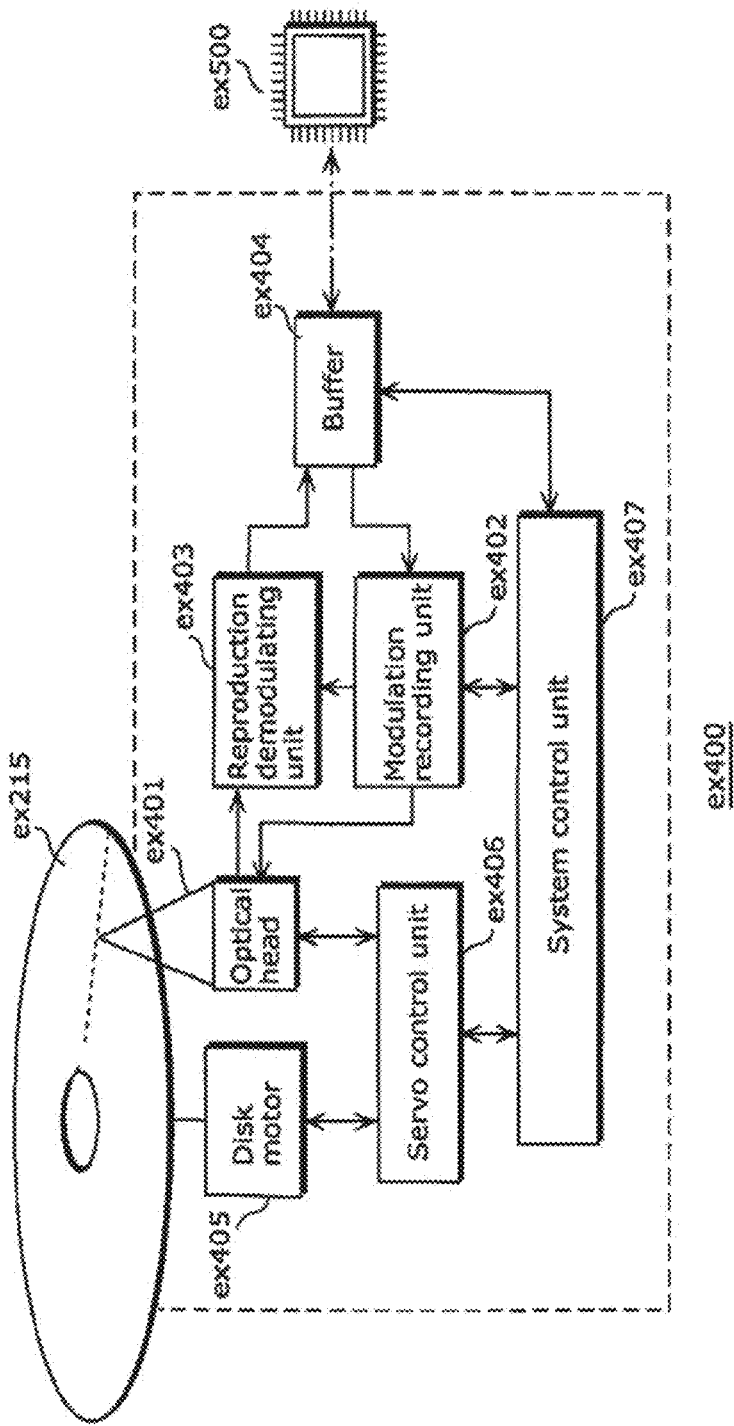
FIG. 12 is a block diagram illustrating an example of a configuration of an information reproducing/recording unit that reads and writes information from or on a recording medium that is an optical disk.

As an example, FIG. 12 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 13:
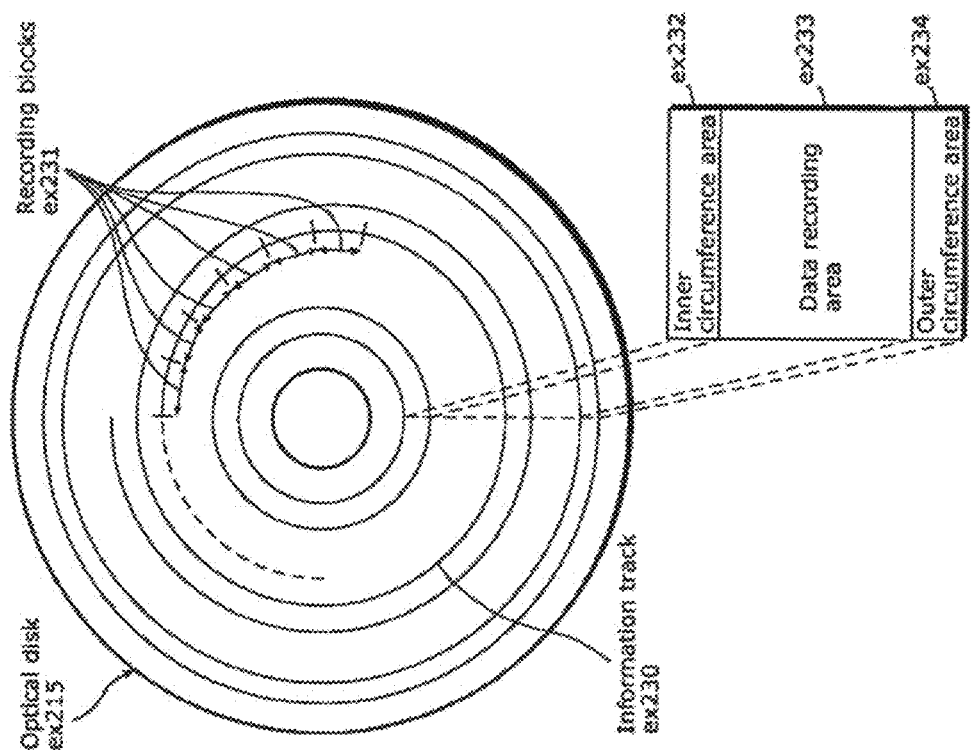
FIG. 13 is a schematic drawing showing an example of a configuration of a recording medium that is an optical disk.

FIG. 13 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 10. The same will be true for the configuration of the computer ex111, the cellular phone ex114, and others.

Figure 14A:
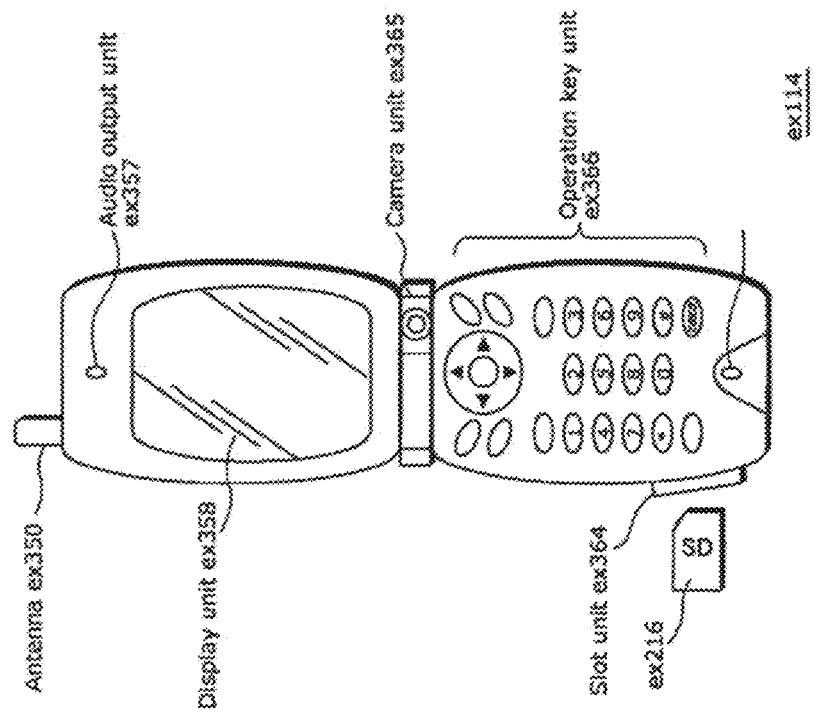
FIG. 14A is a schematic drawing illustrating an example of a cellular phone.
Figure 14B:
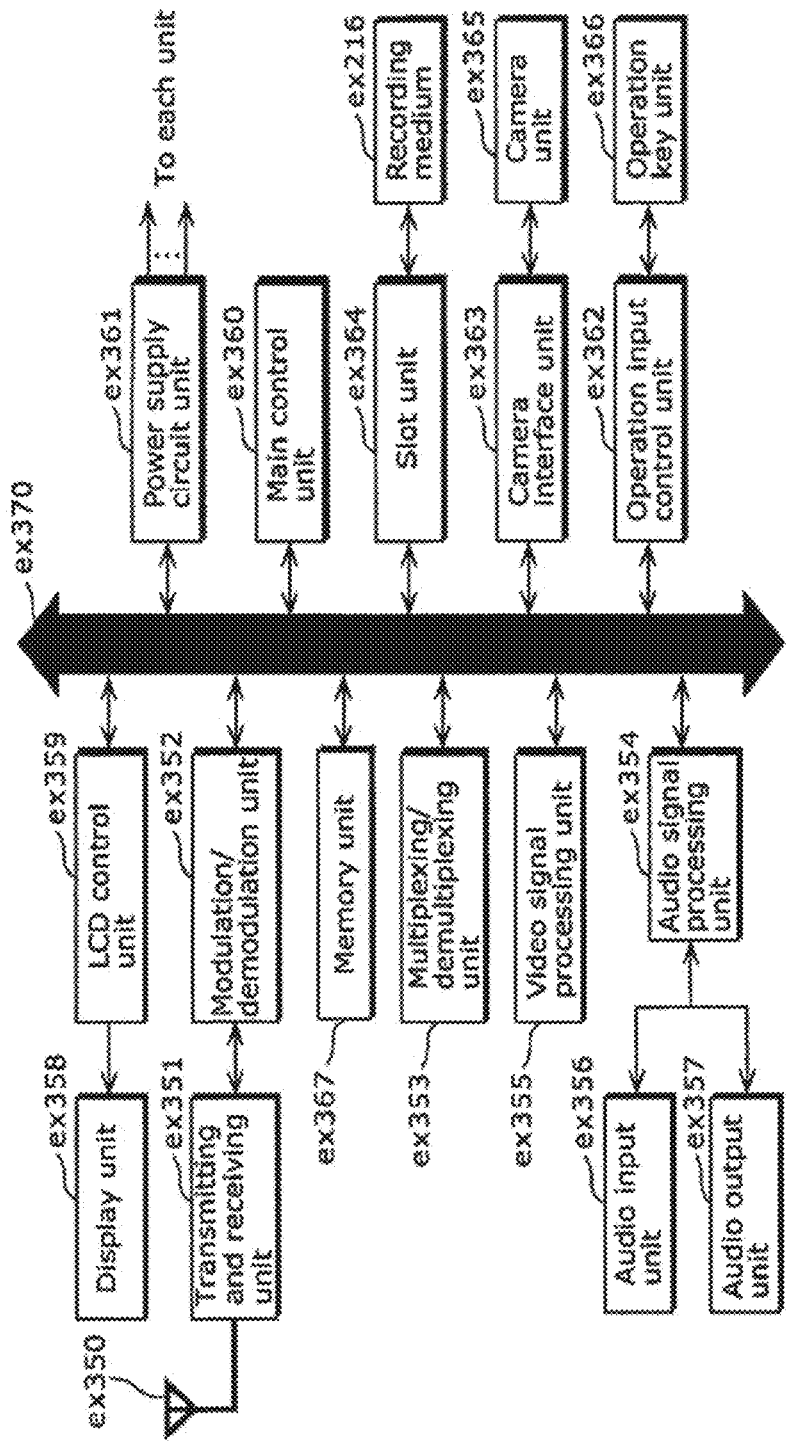
FIG. 14B is a block diagram showing an example of a configuration of the cellular phone.

FIG. 14 (*a*) illustrates the cellular phone ex114 that uses the video coding method and the video decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 14 (b). In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350.

Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in each of embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method.

Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Video data can be generated by switching, as necessary, between (i) the video coding method or the video coding apparatus shown in each of embodiments and (ii) a video coding method or a video coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of embodiments will be hereinafter described. The multiplexed data is a digital stream in the MPEG2-Transport Stream format.

Figure 15:
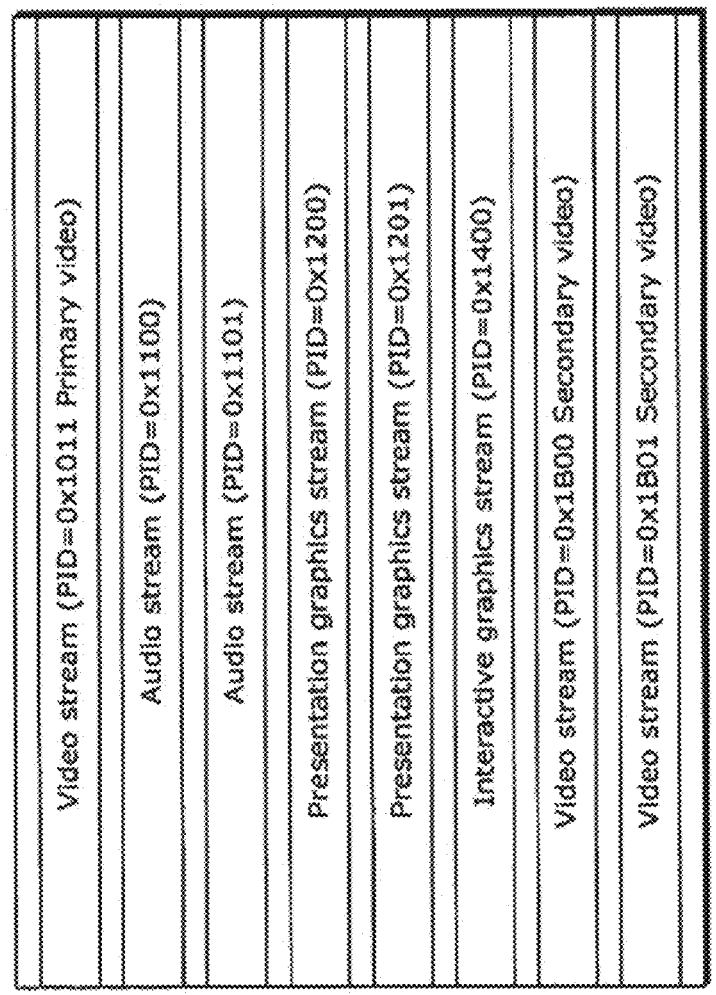
FIG. 15 is a schematic drawing showing a structure of multiplexed data.

FIG. 15 illustrates a structure of the multiplexed data. As illustrated in FIG. 15, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the video coding method or by the video coding apparatus shown in each of embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 16:
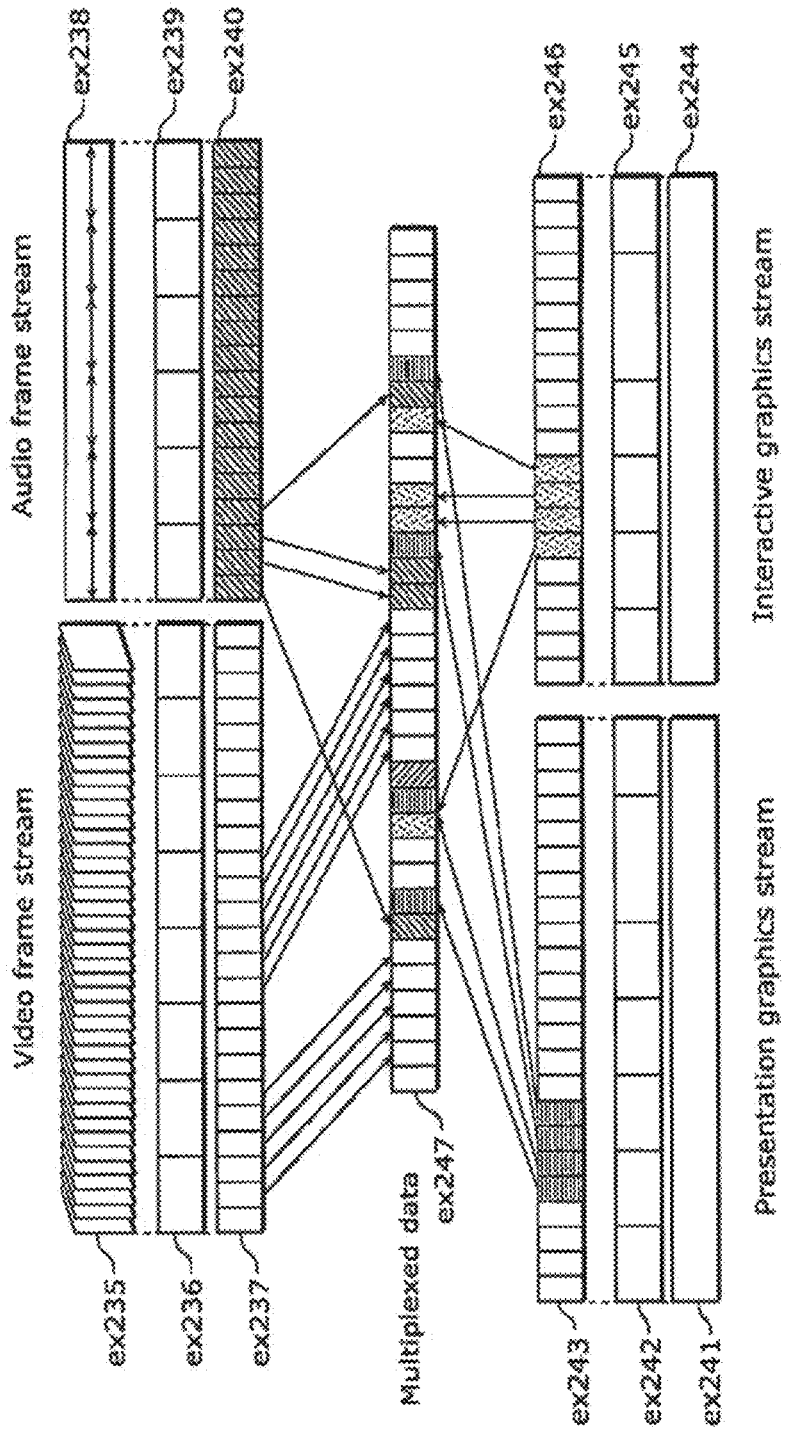
FIG. 16 is a schematic drawing schematically illustrating how each of the streams is multiplexed in multiplexed data.

FIG. 16 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 17:
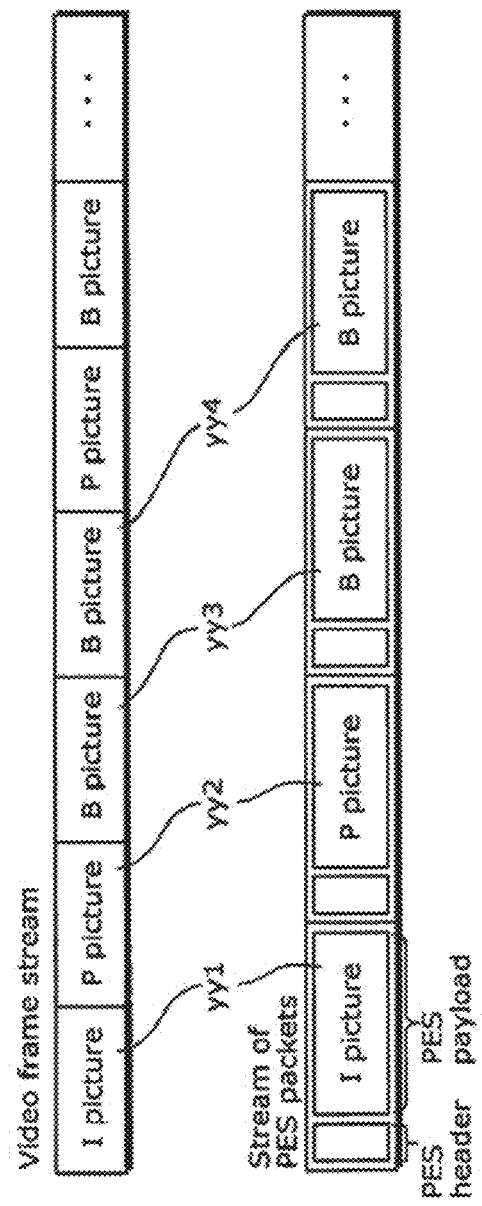
FIG. 17 is a schematic drawing illustrating how a video stream is stored in a stream of PES packets in more detail.

FIG. 17 illustrates how a video stream is stored in a stream of PES packets in more detail. The first bar in FIG. 17 shows a video frame stream in a video stream. The second bar shows the stream of PES packets. As indicated by arrows denoted as yy1, yy2, yy3, and yy4 in FIG. 17, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 18:
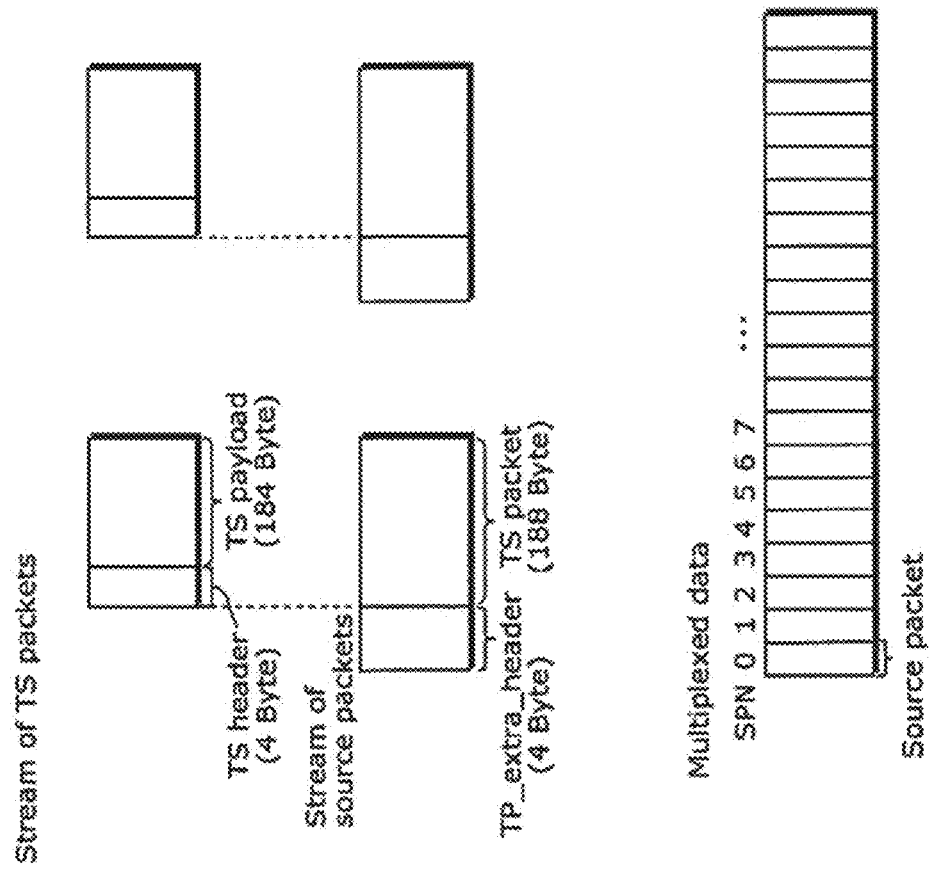
FIG. 18 is a schematic drawing showing a structure of TS packets and source packets in the multiplexed data.

FIG. 18 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 18. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 19:
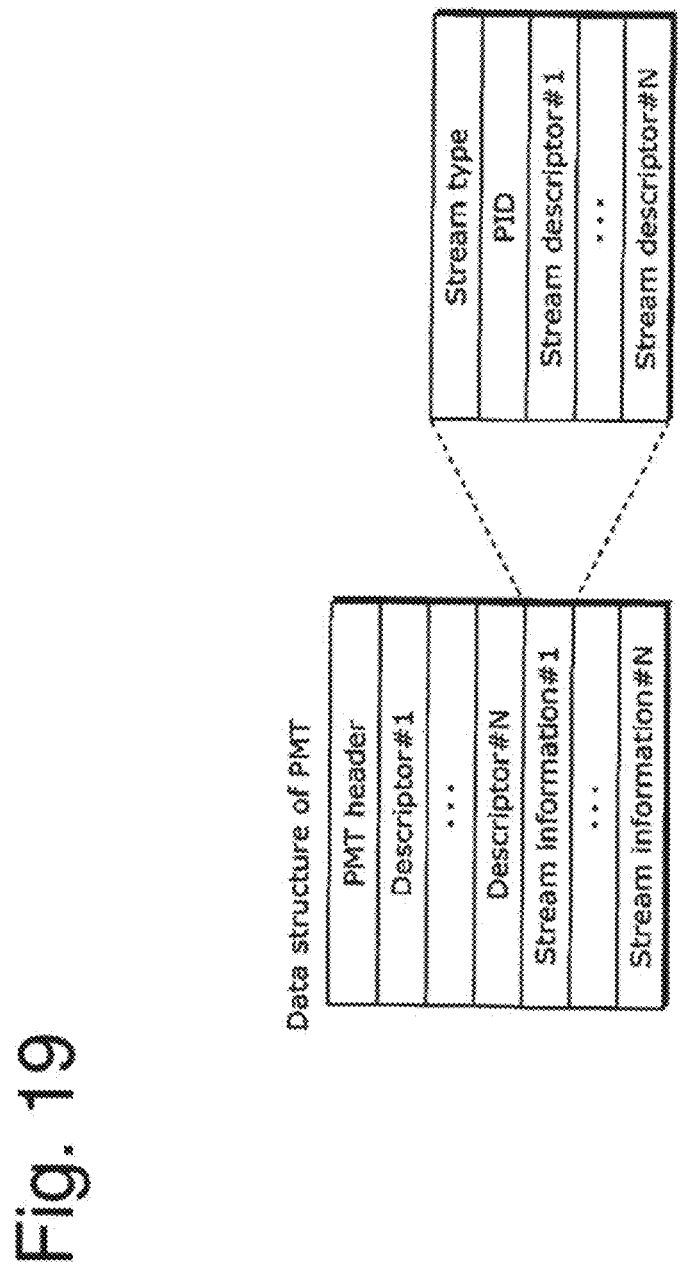
FIG. 19 is a schematic drawing showing a data structure of a PMT.

FIG. 19 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data. When the multiplexed data is recorded on a recording medium and others, it is recorded together with multiplexed data information files.

Figure 20:
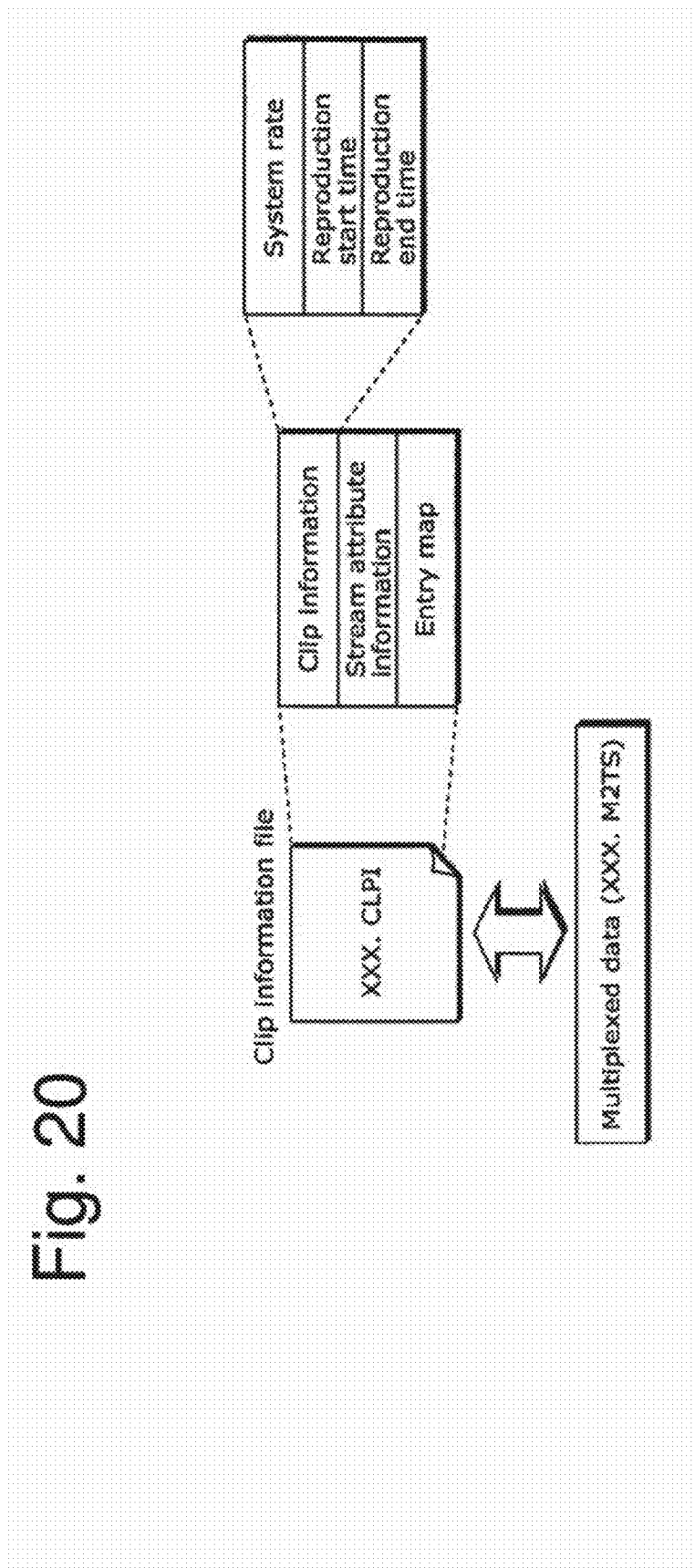
FIG. 20 is a schematic drawing showing an internal structure of multiplexed data information.

Each of the multiplexed data information files is management information of the multiplexed data as shown in FIG. 20. The multiplexed data information files are in one to one correspondence with the multiplexed data, and each of the files includes multiplexed data information, stream attribute information, and an entry map.

As illustrated in FIG. 20, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 21:
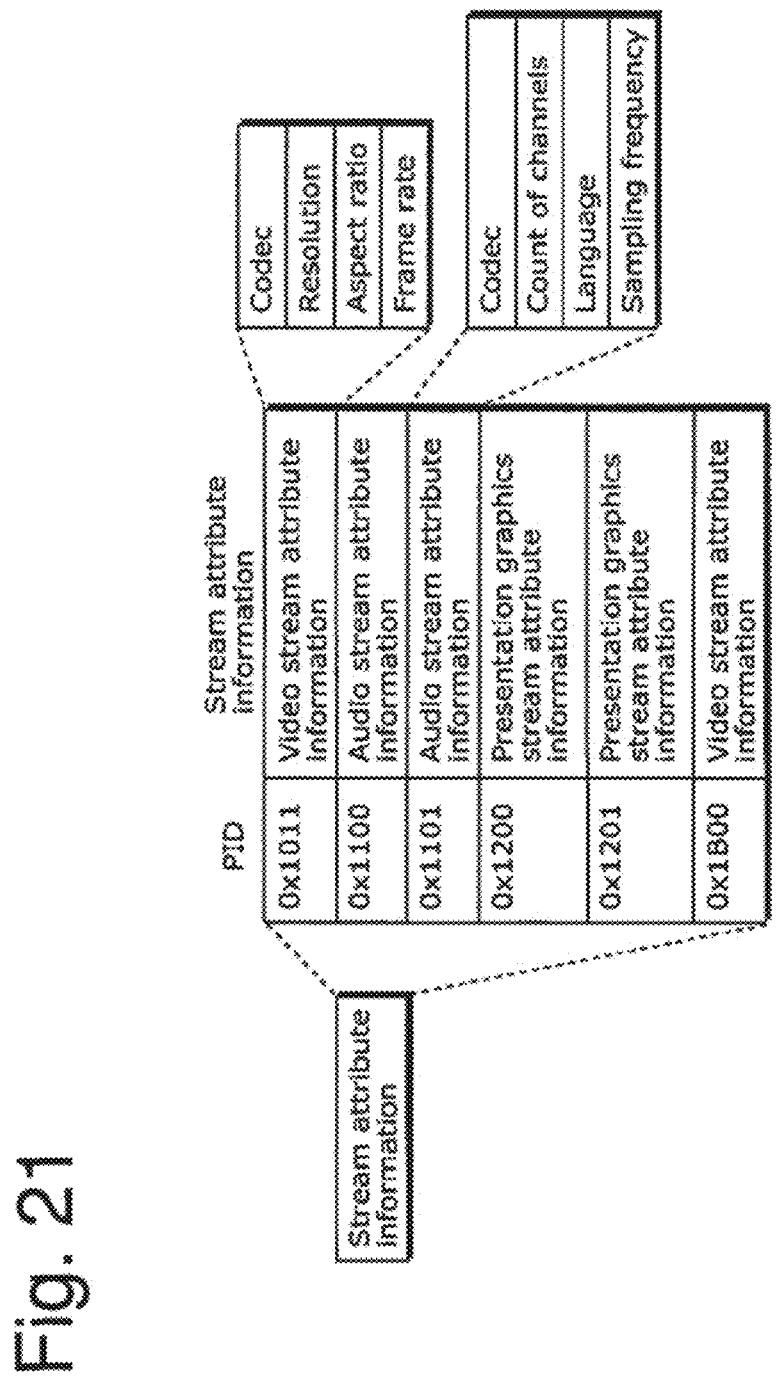
FIG. 21 is a schematic drawing showing an internal structure of stream attribute information.

As shown in FIG. 21, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

The multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of embodiments includes a step or a unit for allocating unique information indicating video data generated by the video coding method or the video coding apparatus in each of embodiments, to the stream type included in the PMT or the video stream attribute information. With the configuration, the video data generated by the video coding method or the video coding apparatus described in each of embodiments can be distinguished from video data that conforms to another standard.

Figure 22:
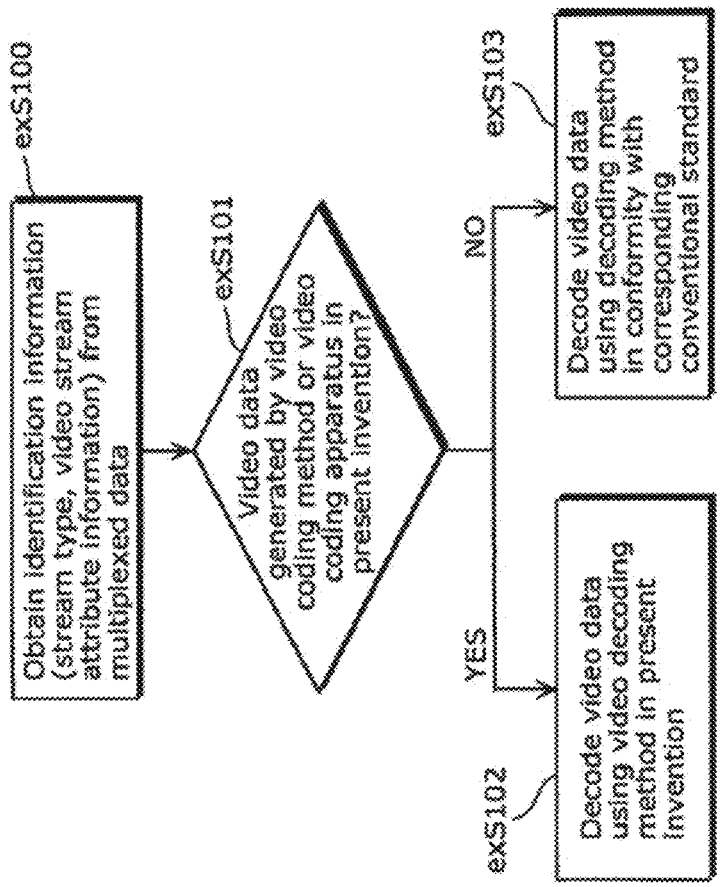
FIG. 22 is a schematic drawing showing steps for identifying video data.

Furthermore, FIG. 22 illustrates steps of the video decoding method. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of embodiments. When it is determined that the stream type or the video stream attribute information indicates that the multiplexed data is generated by the video coding method or the video coding apparatus in each of embodiments, in Step exS102, decoding is performed by the video decoding method in each of embodiments. Furthermore, when the stream type or the video stream attribute information indicates conformance to the conventional standards, such as MPEG-2, MPEG4-AVC, and VC-1, in Step exS103, decoding is performed by a video decoding method in conformity with the conventional standards.

As such, allocating a new unique value to the stream type or the video stream attribute information enables determination whether or not the video decoding method or the video decoding apparatus that is described in each of embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus can be used in the devices and systems described above.

Figure 23:
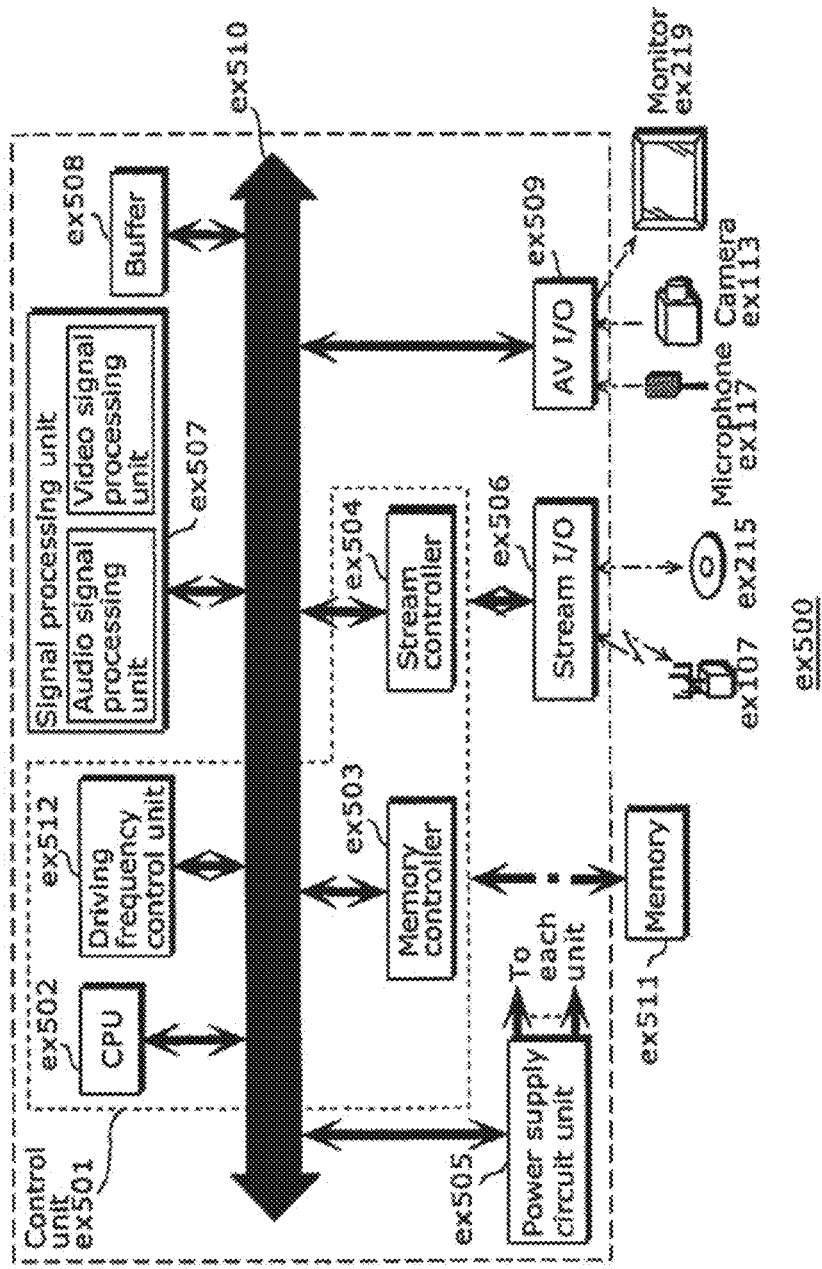
FIG. 23 is a block diagram illustrating an example of a configuration of an integrated circuit for implementing the video coding method and the video decoding method according to each of embodiments.

Each of the video coding method, the video coding apparatus, the video decoding method, and the video decoding apparatus in each of embodiments is typically achieved in the form of an integrated circuit or a Large Scale Integrated (LSI) circuit. As an example of the LSI, FIG. 23 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV 10 ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

When video data generated in the video coding method or by the video coding apparatus described in each of embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 24:
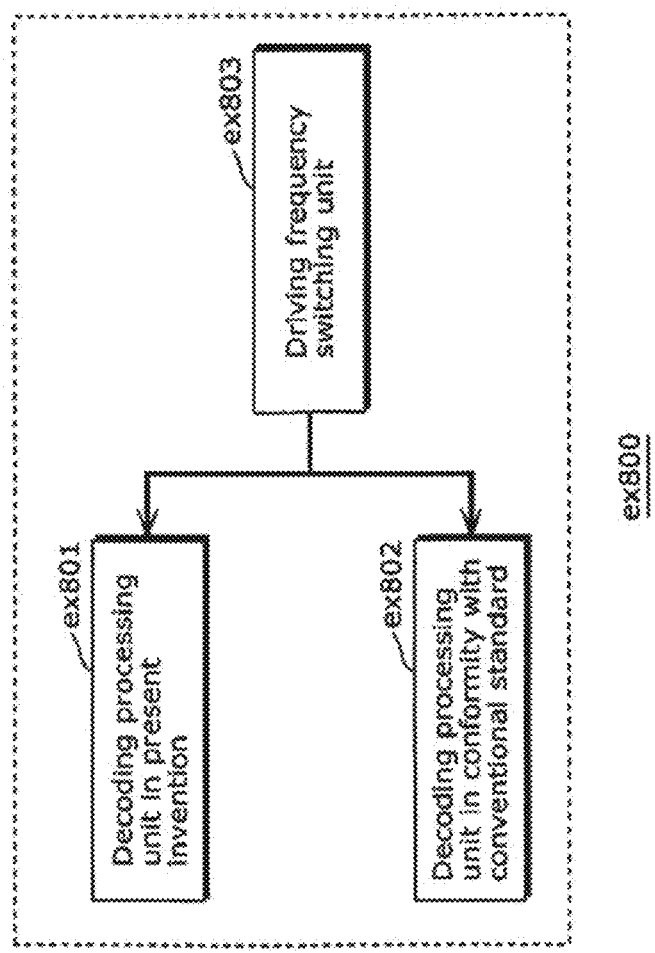
FIG. 24 is a schematic drawing showing a configuration for switching between driving frequencies.

In order to solve the problem, the video decoding apparatus, such as the television ex300 and the LSI ex500 is configured to determine to which standard the video data conforms, and switch between the driving frequencies according to the determined standard. FIG. 24 illustrates a configuration ex800. A driving frequency switching unit ex803 sets a driving frequency to a higher driving frequency when video data is generated by the video coding method or the video coding apparatus described in each of embodiments. Then, the driving frequency switching unit ex803 instructs a decoding processing unit ex801 that executes the video decoding method described in each of embodiments to decode the video data. When the video data conforms to the conventional standard, the driving frequency switching unit ex803 sets a driving frequency to a lower driving frequency than that of the video data generated by the video coding method or the video coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 23. Here, each of the decoding processing unit ex801 that executes the video decoding method described in each of embodiments and the decoding processing unit ex802 that conforms to the conventional standard corresponds to the signal processing unit ex507 in FIG. 23. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described is probably used for identifying the video data. The identification information is not limited to the one described above but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 26. The driving frequency can be selected by storing the look-up table in the buffer ex508 and in an internal memory of an LSI, and with reference to the look-up table by the CPU ex502.

Figure 25:
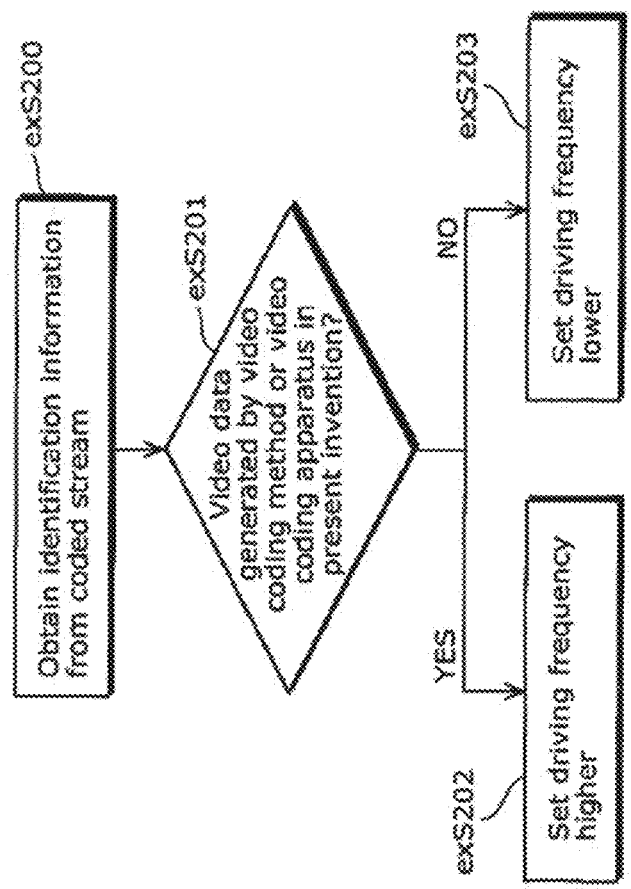
FIG. 25 is a schematic drawing showing steps for identifying video data and switching between driving frequencies.

FIG. 25 illustrates steps for executing a method. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the video coding method and the video coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the video coding method and the video coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG 4-AVC is larger than the processing amount for decoding video data generated by the video coding method and the video coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 27A:
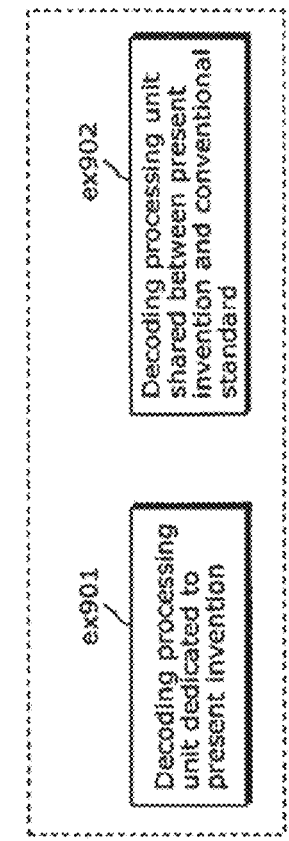
FIG. 27A is a schematic drawing showing an example of a configuration for sharing a module of a signal processing unit.

In order to solve the problem, what is conceived is a configuration in which the decoding processing unit for implementing the video decoding method described in each of embodiments and the decoding processing unit that conforms to the conventional standard, such as MPEG-2, MPEG4-AVC, and VC-1 are partly shared. Ex900 in FIG. 27(a) shows an example of the configuration. For example, the video decoding method described in each of embodiments and the video decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing unique to the present invention. Since the present invention is characterized by a spatial prediction, for example, the dedicated decoding processing unit ex901 is used for spatial prediction in accordance with the present invention. Otherwise, the decoding processing unit is probably shared for one of the entropy coding, inverse transformation, inverse quantization, and motion compensated prediction, or all of the processing. The decoding processing unit for implementing the video decoding method described in each of embodiments may be shared for the processing to be shared, and a dedicated decoding processing unit may be used for processing unique to that of MPEG4-AVC.

Figure 27B:
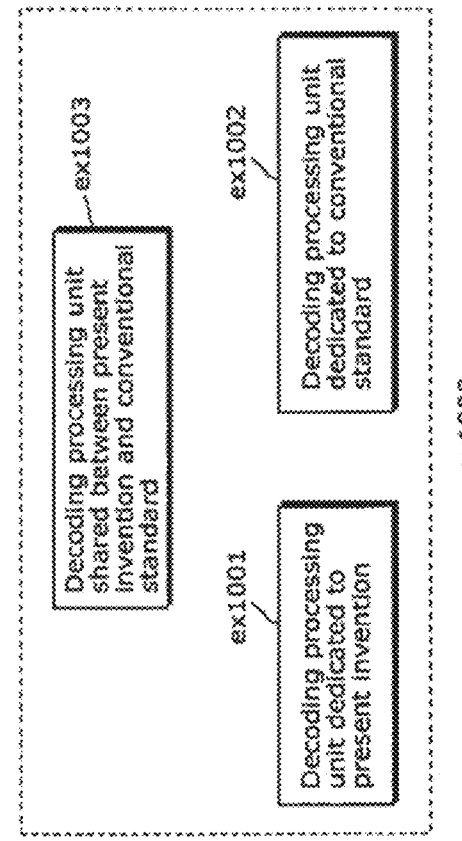
FIG. 27B is a schematic drawing showing another example of a configuration for sharing a module of a signal processing unit.

Furthermore, ex1000 in FIG. 27(b) shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

Summarizing, the present invention relates to intra prediction which may be performed during encoding and/or decoding of an image signal. In particular, the present invention relates to intra prediction of a current block, during which filtering is applied to the prediction signal and/or to signal used for the prediction. The filtering is applied in accordance with a decision based on characteristics of image signal included in block(s) spatially adjacent to the current block.

The invention claimed is:

1. A method for decoding, on a block-by-block basis, encoded image data partitioned into a plurality of blocks, said method comprising:
   detecting a location and a direction of a dominant edge within each image data of a plurality of previously decoded blocks spatially adjacent to a current block, the edge intersecting the current block and the plurality of the previously decoded blocks being used for intra prediction of the current block;
   deciding on the basis of the detected dominant edge whether either a first filtering or a second filtering is to be applied to pixels of the previously decoded blocks to be used as reference pixels for intra-prediction depending on the proximity of said pixels of the previously decoded blocks relative to the detected dominant edge; and
   predicting the current block from the image data of the previously decoded blocks by intra prediction,
   wherein in said predicting of the current block, intra prediction is performed using filtered image data of the previously decoded blocks to which the first filtering is applied as reference for the prediction, when it is decided in said deciding that the first filtering is to be applied, and
   wherein in said predicting of the current block, intra prediction is performed using filtered image data of the previously decoded blocks to which the second filtering is applied as reference for the prediction, when it is decided in said deciding that the first filtering is not to be applied, the second filtering being edge-sharpening filtering applied to n pixels to be used as reference pixels for intra-prediction of the current block around the edge intersection with the current block and the first filtering being low-pass filtering applied to the remaining pixels to be used as reference pixels for intra-prediction of the current block.

2. An apparatus for decoding, on a block-by-block basis, encoded image data partitioned into a plurality of blocks, said apparatus comprising: a controller; a processor; and a memory, said processor configured to perform:
   detecting a location and a direction of a dominant edge within each image data of plurality of previously decoded blocks spatially adjacent to a current block, the edge intersecting the current block and the plurality of the previously decoded blocks being used for intra prediction of the current block;
   deciding on the basis of the detected dominant edge whether either a first filtering or a second filtering is to be applied to pixels of the previously decoded blocks to be used as reference pixels for intra-prediction depending on the proximity of said pixels of the previously decoded blocks relative to the detected dominant edge; and
   predicting the current block from the image data of the previously decoded blocks by intra prediction,
   wherein in said predicting of the current block, intra prediction is performed using filtered image data of the previously decoded blocks to which the first filtering is applied as reference for the prediction, when it is decided in said deciding that the first filtering is to be applied, and
   wherein in said predicting of the current block, intra prediction is performed using filtered image data of the previously decoded blocks to which the second filtering is applied as reference for the prediction, when it is decided in said deciding that the first filtering is not to be applied, the second filtering being edge-sharpening filtering applied to n pixels to be used as reference pixels for intra-prediction of the current block around the edge intersection with the current block and the first filtering being low-pass filtering applied to the remaining pixels to be used as reference pixels for intra-prediction of the current block.

* * * * *